US007868510B2

(12) United States Patent
Rittenhouse

(10) Patent No.: US 7,868,510 B2
(45) Date of Patent: Jan. 11, 2011

(54) HIGH-EFFICIENCY WHEEL-MOTOR UTILIZING MOLDED MAGNETIC FLUX CHANNELS WITH TRANSVERSE-FLUX STATOR

(76) Inventor: Norman P. Rittenhouse, 1001 N. First St., Fairbury, IL (US) 61739

( * ) Notice: Subject to any disclaimer, the term of this patent is extended or adjusted under 35 U.S.C. 154(b) by 2 days.

(21) Appl. No.: 12/486,957

(22) Filed: Jun. 18, 2009

(65) Prior Publication Data
US 2009/0322165 A1   Dec. 31, 2009

Related U.S. Application Data

(60) Continuation-in-part of application No. 12/371,823, filed on Feb. 16, 2009, now Pat. No. 7,723,891, which is a division of application No. 11/731,427, filed on Mar. 30, 2007, now Pat. No. 7,492,074.

(51) Int. Cl.
*H02K 1/02* (2006.01)
(52) U.S. Cl. ............................. 310/216.069; 310/257; 310/267; 310/268
(58) Field of Classification Search ............... 310/43, 310/156.53, 156.56, 216.003, 216.023–216.025, 310/216.027, 216.033–216.035, 216.066–216.067, 310/216.069–216.074, 257, 267, 268
See application file for complete search history.

(56) References Cited

U.S. PATENT DOCUMENTS

| 3,665,227 A | | 5/1972 | Busch |
| 4,625,392 A | | 12/1986 | Stokes |
| 4,853,567 A | | 8/1989 | Muramatsu et al. |
| 5,051,641 A | * | 9/1991 | Weh ........................... 310/163 |
| 5,289,072 A | * | 2/1994 | Lange ......................... 310/266 |
| 5,533,587 A | | 7/1996 | Dow et al. |
| 5,777,413 A | | 7/1998 | Nagata et al. |
| 5,886,449 A | * | 3/1999 | Mitcham ............. 310/216.001 |

(Continued)

FOREIGN PATENT DOCUMENTS

EP        763880 A1 *   3/1997

(Continued)

*Primary Examiner*—Tran N Nguyen
(74) *Attorney, Agent, or Firm*—Brian S. Steinberger; Phyllis K. Wood; Law Offices of Brian S. Steinberger, P.A.

(57) ABSTRACT

A motor including an outside rotor having a rotor disc with plural magnets alternating polarities flush mounted in the disc, an inside stator assembly with a ring of pole pieces forming a channel to house a transversely wound stator windings, and a controller coupled with feedback electronics for monitoring a timing, speed and direction and coupling a signal to a processing unit for adjusting the drive electronics driving the phase windings. A u-shaped gap above the channel to receive the rotor disc and focus the captured magnetic flux in the pole pieces toward the magnets. In an embodiment the molded magnetic flux channel pole pieces of the inside stator are sets of molded magnetic flux channel pole pieces, each set forming a channel and corresponding to one phase of the motor; and a section of each one of the transverse windings passing through one channel, the remaining section folding back outside the set in close proximity to the outer base of the set of molded magnetic flux channel pole pieces.

34 Claims, 20 Drawing Sheets

U.S. PATENT DOCUMENTS

| | | |
|---|---|---|
| 6,044,921 A | 4/2000 | Lansberry |
| 6,220,377 B1 | 4/2001 | Lansberry |
| 6,492,756 B1 | 12/2002 | Maslov et al. |
| 6,882,066 B2 * | 4/2005 | Kastinger ................. 310/49.08 |
| 7,492,074 B1 * | 2/2009 | Rittenhouse ................. 310/265 |
| 7,579,742 B1 * | 8/2009 | Rittenhouse ................. 310/257 |
| 7,640,648 B1 * | 1/2010 | Rittenhouse ................. 29/596 |
| 7,723,891 B2 * | 5/2010 | Rittenhouse ......... 310/216.023 |
| 7,772,741 B1 * | 8/2010 | Rittenhouse ................ 310/257 |
| 2003/0193263 A1 | 10/2003 | Maslov et al. |

FOREIGN PATENT DOCUMENTS

| | | |
|---|---|---|
| WO | WO9504399 | 2/1995 |
| WO | WO 9504399 A1 * | 2/1995 |

* cited by examiner

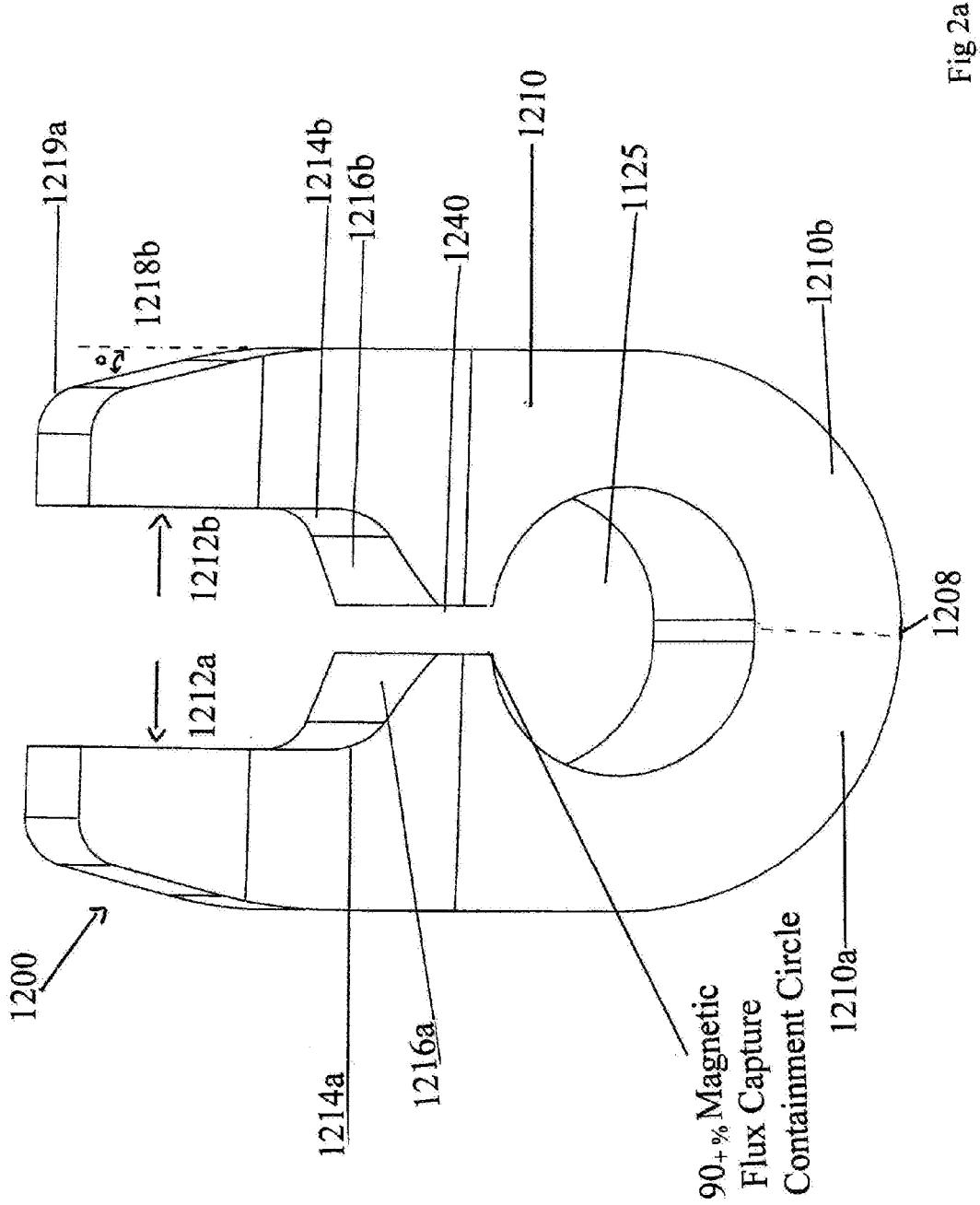

HIGH-EFFICIENCY WHEEL-MOTOR UTILIZING MOLDED MAGNETIC FLUX CHANNELS WITH TRANSVERSE-FLUX STATOR

This application is a continuation-in-part of U.S. application Ser. No. 12/371,823 filed on Feb. 16, 2009, which is a divisional application of U.S. application Ser. No. 11/731,427 filed on Mar. 30, 2007, now U.S. Pat. No. 7,492,074.

FIELD OF THE INVENTION

This invention relates to motors and, in particular, to methods, systems and apparatus for a high efficiency direct drive high torque parallel pole motor utilizing mated molded magnetic flux channel parallel pole pieces with transverse flux stator windings.

BACKGROUND AND PRIOR ART

Approximately 93% of motors constructed use iron cores, or variations thereof, to concentrate magnetic flux and boost torque. "Coreless" motors are suited for very high RPM's with low torque and iron core motors usually utilize insulated steel laminations in their stators which reduce heat losses from eddy currents. However, even with thinner laminations, the eddy currents are only blocked in one plane. So to further reduce eddy current losses, silicon is typically added to the steel to reduce its electrical conductivity. Although the silicon reduces some remaining eddy current losses (by reducing the current conductivity), the addition of silicon actually worsens the magnetic conductivity. This reduction of magnetic strength reduces the maximum amount of torque produced, and also reduces electrical efficiency.

Most prior art multi-phase motors use phase windings radially sequenced around the plane of rotation. The close coupled proximity results in "Armature Effect" which reduces efficiency at higher speeds. The usual multi-phase high speed motors also require a gearbox or other loss prone speed reducing device in order to boost torque. Additionally, conventional motors use some variation of axial or radial flux, with multiple salient windings wound around iron type cores. Although this boosts magnetic flux, it also increases inductance and electrical resistance, and reactance. At higher speeds, the inductive and reactive losses limit top speed and efficiency at high speed.

Known prior art direct drive motors include U.S. Pat. No. 4,625,392 issued to Stokes on Dec. 2, 1986 titled Method of manufacturing a molded rotatable assembly for dynamoelectric machines describes molding a rotor of a motor from magnetic material. However, it does not involve Transverse Flux and does not use molded material for the stator.

U.S. Pat. No. 4,853,567 titled Direct Drive Motor issued on Aug. 1, 1989, which describes a three phase outer rotor motor. However, it uses conventional configuration with the three phase windings sequentially located within the same axis, and does not use Transverse Flux.

U.S. Pat. No. 5,777,413 issued to Lange et al. on Jul. 7, 1999 titled Transverse flux motor with magnetic floor gap describes a locomotive motor with Transverse Flux. However, it uses conventional iron laminations as its flux path, and is mainly concerned with physically flattening the motor to allow it to fit into the space between the floor of the locomotive and the train axle.

Prior art transverse Flux motors have historically been too costly to construct, and have rarely been used. This invention simplifies construction and lowers costs of Transverse Flux motors, and at the same time increases electrical efficiency to a higher level than before.

U.S. Patent Application No. 2006/0208602 filed on Mar. 16, 2006 to Enomoto teaches a multiple phase claw pole type motor which includes a plurality of claw poles facing a rotor in a state of being separated from the rotor by a small gap, a radial yoke extending radially outwardly from this claw, and an outer peripheral, yoke extending from this radial yoke portion in the same direction as the direction of extension of the claw portion, a stator core formed by alternately placing the claw poles in a circumferential direction so that a distal end of each claw portion faces the outer peripheral yoke of an adjacent one of the claw poles, and a stator constructed by sandwiching an annular coil with the adjacent claw poles of this stator core, a multiple phase claw pole type motor characterized in that the claw poles are formed by compacting a magnetic powder and are formed of a magnetic compact having a DC magnetizing property.

The differences between the "claw pole" and the parallel pole motor is that claw pole motors have been around since the 1930's and have fatal disadvantages including that they are extremely inefficient—typical values of efficiency are 45-65%; they are limited in torque; eddy currents are very high and fringing losses are very high. Most applications use "claw" shaped poles in an attempt to minimize this loss. That trapezoidal shape of poles however, further limits torque.

Unlike Enomoto, U.S. patent application Ser. No. 11/731,427 filed on Mar. 30, 2007, now U.S. Pat. No. 7,492,074 issued on Feb. 17, 2009 to Rittenhouse, describes a direct drive motor, not a claw pole motor. The Rittenhouse '074 direct drive motor overcame a problem with prior art motors by using separate, independent, uncoupled planes for each phase, and phase and pulse timing to eliminate the "Armature Effect" which results is much higher efficiency at higher speed. The motor also has very high torque and can drive directly most loads without requiring clutches, gearboxes, or other speed reducing devices. The result is greater efficiency, lower costs, and fewer moving parts.

The Rittenhouse '074 patent also overcomes prior problems associated with boosting magnetic flux, which increases inductance and resistance and at higher speeds; the inductive losses limit top speed and efficiency at high speed. The direct drive motor of the present invention can use radial flux construction, but the preferred embodiment is Transverse Flux construction. In Transverse Flux construction, one large single winding powers each phase. Because magnetic flux is directly proportional to Ampere-Turns, the same magnetic flux can be achieved with more turns with less amperage, or higher amperage and fewer turns. In the preferred embodiment, this novel motor has fewer turns, and higher amperages. With fewer turns, the inductance is less, and with larger copper conductors the electrical resistance is also less. Since the inductance and resistance are reduced, both the inductive losses and the resistive losses are greatly reduced which results in higher efficiency and a much higher usable speed range. However, performance and cost of Neodymium-iron-boron permanent magnets have increased since the development and filing of the Rittenhouse '074 patent.

What is needed is a direct drive motor that uses less magnetic weight and still has the same performance that can be three stator or one single stator. Also needed is a direct drive motor having an overall weight that is reduced by over half, uses improved magnetic flux pole pieces shaped for a simplified, shortened magnetic path.

SUMMARY OF THE INVENTION

A primary objective of the invention is to provide methods, systems and devices for a very high efficiency direct drive high torque motor utilizing mating molded magnetic flux channels pole pieces with transverse stator windings.

A secondary objective of the invention is to provide methods, systems and devices for a high efficiency direct drive high torque motor constructed using mating molded magnetic flux channels pole pieces having a shape with an axial slot to accommodate the rotor permanent magnet and an air gap. In a preferred embodiment, each pair of mated pole pieces includes two air gaps.

A third objective of the invention is to provide methods, systems and devices for a high efficiency direct drive high torque motor using mated pole pieces accommodating a rotor permanent magnet using both sides of the rotor's permanent magnets to eliminate the need for a magnetic flux return path for adjacent magnets resulting in increasing magnetic performance per pound of permanent magnet material.

A fourth objective of the invention is to provide methods, systems and devices for a three stator direct drive high torque motor utilizing mated molded magnetic flux channel pole pieces with transverse flux stator windings.

A fifth objective of the invention is to provide methods, systems and devices for a single stator direct drive high torque motor utilizing mated molded magnetic flux channel pole pieces with transverse flux stator windings.

A sixth objective of the invention is to provide methods, systems and devices for a high efficiency direct drive high torque motor for use as a wheel motor. A tubeless tire can be mounted on the rotor drum and the tubeless tire can be partially filled with a liquid coolant which then cools to rotor drum and attached permanent magnets.

A seventh objective of the invention is to provide methods, systems and devices for a high efficiency direct drive high torque motor having a sufficient torque to directly power track wheels, wheel motors or marine propellers.

An eighth objective of the invention is to provide methods, systems and devices for a high efficiency direct drive high torque motor for use as a high efficiency motor, high efficiency generator or a dynamo. The motor may also be used as a synchronous motor.

The present invention overcomes the problems with the prior art U.S. Pat. No. 7,492,074 patent issued Feb. 17, 2009 to the same inventor as the subject application, which is incorporated herein by reference, with the following improvements:

1) Overall weight of motor/generator reduced by approximately greater than 50 percent.

2) Size, weight, and cost of the permanent magnets by approximately greater than one-half.

3) Mating molded magnetic flux-channel pole pieces have simplified, shortened magnetic path.

4) An outer steel shell replaced with other inert materials such as fiberglass or carbon fiber to reduce the overall weight of the motor.

5) Simplified building block construction.

6) Improved driving electronics

A first preferred embodiment of the invention is a parallel pole direct drive wheel motor includes an outside rotor having a rotor disc having plural holes around a circumference of the rotor disc a distance from the outer edge with plural magnets having alternating polarities flush mounted into the plural holes, an inside stator assembly having a ring of plural molded magnetic flux channel pole pieces corresponding to a phase of the motor forming a hollow channel for housing a transversely wound stator windings to capture and focus the magnetic flux emanating from the transverse winding and channel to the plural pole pieces, each pole piece body having a u-shaped gap above the channel to receive the rotor disc and inserted magnets with a gap therebetween and formed with tapered exterior sides and radiused curves in the base of the u-shaped gap to direct and focus the captured magnetic flux toward and delivering it to the flat, axial magnetic pole surfaces with parallel sides of the u-shaped gap, perpendicular magnetic lines of force emanating at the pole piece surfaces and a controller coupled with a feedback electronics for monitoring a timing, speed and direction and coupling the feedback signal to a processing unit for determining and adjusting and drive electronics to driving the phase windings.

In an embodiment, the rotor disc containing the plural magnets is one of a plastic or other inert material and having plural alignment and mounting holes for connection of the torque produced by said interaction to the rotor of the motor/generator and each one of the plural molded magnetic flux channel pole pieces includes two pole pieces mated to form the channel connected at the base of the channel and have an isolation gap above the channel and the u-shaped gap above the isolation gap. The gap between the upper portion of the mated pole pieces above the transversely wound stator winding includes an isolation gap between the channel and the u-shaped gap to minimize fringing loss during operation and an axial u-shaped gap above the isolation gap. The axial u-shaped gap is larger than the isolation gap for mating the plural magnets with the axial u-shaped gap to deflect the magnetic flux from the stator winding and channel to the magnets. The axial u-shaped gap includes a c-shaped lower section formed by the mated first and second pole piece, each one of the first and second pole piece having a first flux focus angle forming a first deflection area, and a second flux focus angle forming a second deflection area, to deflect the flux. The parallel pole piece interior surfaces form the upper section of the axial u-shaped gap with the plural magnets passing between the parallel surfaces during operation with a gap between each parallel pole pieces and each pole of the plural magnets. In another embodiment, the rotor disc includes plural rotor discs separated by rotor disc spacers to form the outside rotor. The rotor disc can be fabricated into two or more segments to allow rotor disc to be inserted into the pole piece unshaped gap after the stator assembly is complete.

The drive electronics can include a WYE, Delta, or STAR configured electrical circuit connected to the transverse stator windings to apply voltage waveform and current to the transverse stator winding and feedback electronics can include a sensor device to sense speed, acceleration, and load connected with the processing unit to send a signal representing the sensed speed, acceleration, and load wherein the processing unit to adjust the timing and waveform of the applied voltage and current to the windings according to an optimum waveform and timing information digitally stored in a lookup table database. The electronics can also include silicon carbide MOSFET semiconductor switches, each one connected to one leg of the one of the STAR, DELTA, OR WYE electrical circuits to independently drive each transverse winding and reduce electrical interaction to increase switching frequency and efficiency. The motor can also include a voltage regulator and a power semiconductor switches serially connected to feed a stator phase winding, the semiconductor switches switched on and off once for each electrical half cycle to apply the voltage waveform to the corresponding stator phase winding from the output of the series voltage regulator or to vary a pulse timing and duration to control motor speed and torque.

The electronics can also include an LRC filter connected between the semiconductor switches and the one of the STAR, DELTA, OR WYE electrical circuits to remove switching frequency noise to reduce interference to the magnetization response of the molded magnetic flux channels pole pieces to reducing hysteresis loss and improve torque and efficiency and can include a feedback circuit for obtaining a current feedback waveform from the output of the LRC filters, wherein the processing unit compares the current feedback signal with a stored optimal current waveform to generate a corrected applied voltage and current waveform to driving the transverse windings of the motor during operation. The controller feedback circuit can include plural cascaded Hall effect sensors located near the path of the rotor permanent magnets to generate a stair step sine wave to conveys information on rotor speed, direction, and timing to the processing for generating an output waveform for driving the motor.

The controller can include a waveform lookup table stored in memory coupled with the processing unit, the waveform lookup table containing digital representations of optimal current and voltage waveforms for best motor performance at various speeds, power loadings, acceleration and deceleration rates, wherein the processing unit compares the feedback signal with data in the waveform lookup table to adjust the output of the drive electronics and/or an over-running flyforward diode in series with each semiconductor switch to allow higher speed motor operation wherein the reverse EMF voltage of the stator can exceed the maximum power supply voltage available.

A second embodiment includes at least two sets of molded magnetic flux channel pole pieces forming a corresponding channel, each set separated by a distance and corresponding to one phase of the motor and at least two transverse windings, a section of each one of the transverse windings passing through one of the channels, the remaining section of each transverse winding folding back outside the set of molded magnetic flux channel pole pieces in close proximity to the outer base of the set of corresponding molded magnetic flux channel pole pieces, each set of molded magnetic flux channel pole pieces and corresponding transverse winding forming a partial stator.

Further objects and advantages of this invention will be apparent from the following detailed description of preferred embodiments which are illustrated schematically in the accompanying drawings.

BRIEF DESCRIPTION OF THE FIGURES

FIG. 2a is a perspective side view of mating molded magnetic flux channel pole pieces.

FIG. 14a is a front view showing a single rotor assembly according to the alternative embodiment shown in FIG. 6 showing the spacing of the magnets.

FIG. 14b is a side view of the single rotor assembly shown in FIG. 14a.

DESCRIPTION OF THE PREFERRED EMBODIMENTS

Figure 1A:
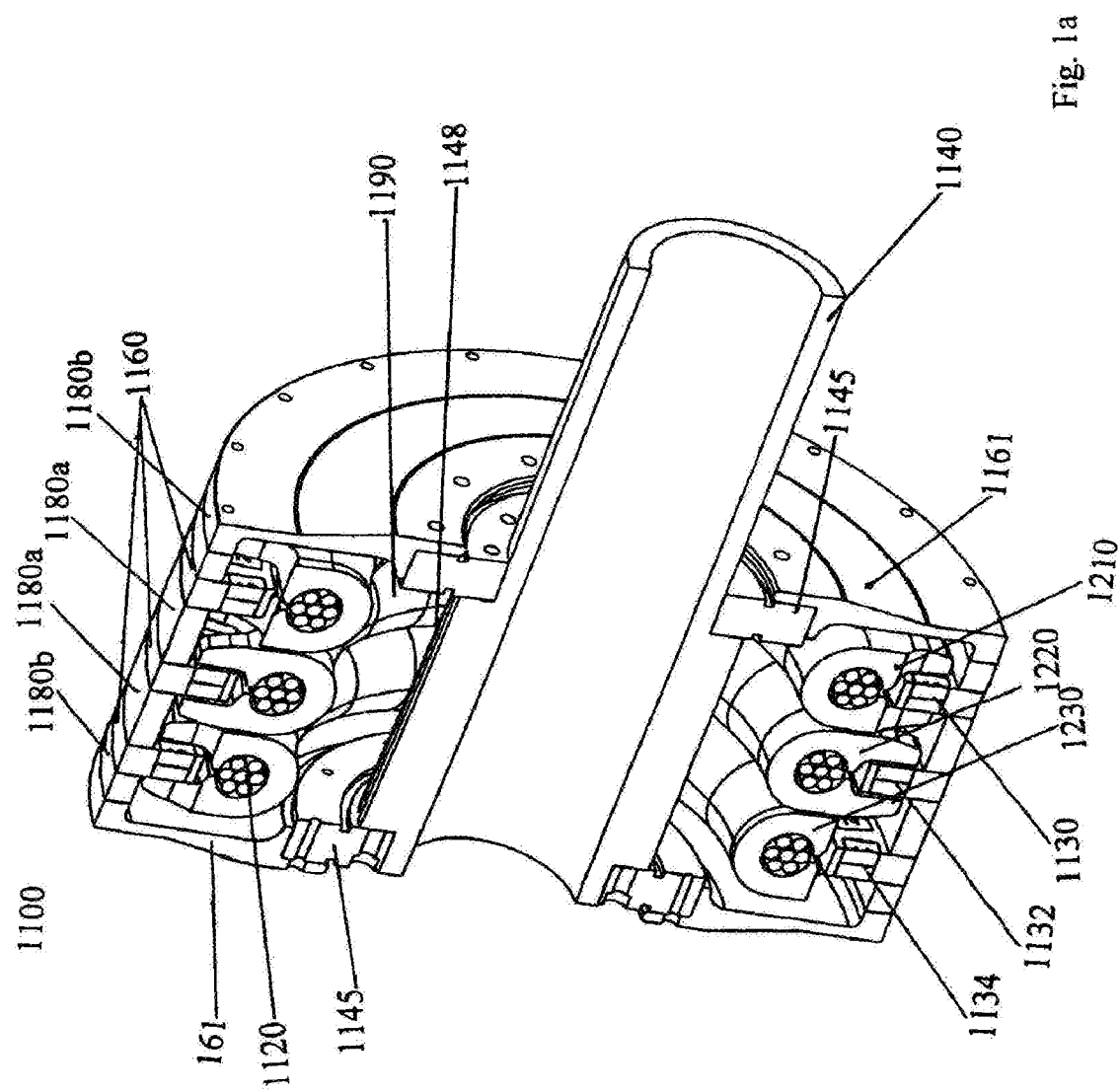
FIG. 1a is a cross sectional perspective view of a wheel motor according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 1100 | motor |
| 1120 | transverse winding |
| 1125 | channel |
| 1130 | permanent magnets |
| 1130a | permanent magnets, phase A |
| 1130b | permanent magnets, phase B |
| 1130c | permanent magnets, phase C |
| 1135a | air gap |
| 1135b | air gap |
| 1140 | mounting shaft |
| 1145 | bearing |
| 1148 | splined surface |
| 150 | Magnetic Flux Channels |
| 1160 | rotating disc |
| 1160a | rotating disc, phase A |
| 1160b | rotating disc, phase B |
| 1160c | rotating disc, phase C |
| 1161 | rotating end plate |
| 162 | mounting shaft hole |
| 1164 | spacer |
| 166 | hub |
| 1168a | alignment plate, phase A |
| 1168b | alignment plate, phase B |
| 1168c | alignment plate, phase C |
| 1170 | alignment |
| 175 | hollow core |
| 1180 | spacers |
| 1190 | epoxy filler |
| 1200 | magnetic pole piece |
| 1206 | alignment key |
| 1208 | split line |
| 1210 | pole pieces |
| 1210a | north pole piece |
| 1210b | south pole piece |
| 1212 | pole flat surface |
| 1214a | second flux focus radius |
| 1214b | second flux focus radius |
| 1216a | first flux focus |
| 1216b | first flux focus |
| 1218a | third flux focus |
| 1218b | third flux focus |
| 1219a | fourth flux focus |
| 1219b | fourth flux focus |
| 1220 | pole pieces, phase B |
| 1230 | pole pieces, phase C |
| 1240 | isolation gap |
| 1245 | isolation open area |
| 1810 | detector module |
| 1820 | controller |
| 1822a | timing look up table |
| 1822b | waveform look up table |
| 1824 | acceleration/deceleration table |
| 1826 | transistors |
| 1828 | LRC filter |
| 1830 | magnet |
| 2100 | motor |
| 2106 | alignment key |
| 2120 | transverse winding channel |
| 2125 | foldback winding |
| 2130 | permanent magnets |
| 2135 | air gap |
| 2150 | magnetic flux pole pieces |
| 2160 | rotor disc |
| 2166 | alignment slot |
| 2168 | alignment disc |

The present invention is a continuation-in-part of U.S. Pat. No. 7,492,074 titled High Efficiency Wheel Motor Utilizing Molded-Magnetic Flux Channels with Transverse-Wound Stators that issued on Feb. 17, 2009 of the same inventor which is incorporated herein by reference. The motor assembly described below provides improvements including a reduction in the overall weight of motor/generator by at least fifty-percent. The design of the molded magnetic flux channels has been simplified to shorten the magnetic path. The outer steel shell can be replaced with other inert materials such as fiberglass or carbon fiber and the driving electronics have been improved.

The methods, systems and apparatus of the present invention provides a high efficiency direct drive high torque motor utilizing mating molded magnetic flux channel pole pieces with transverse windings. As described in detail below, the novel motor can be configured for both a three stator motor or a single stator motor and includes simplified building blocks for construction of the motor.

Figure 1B:
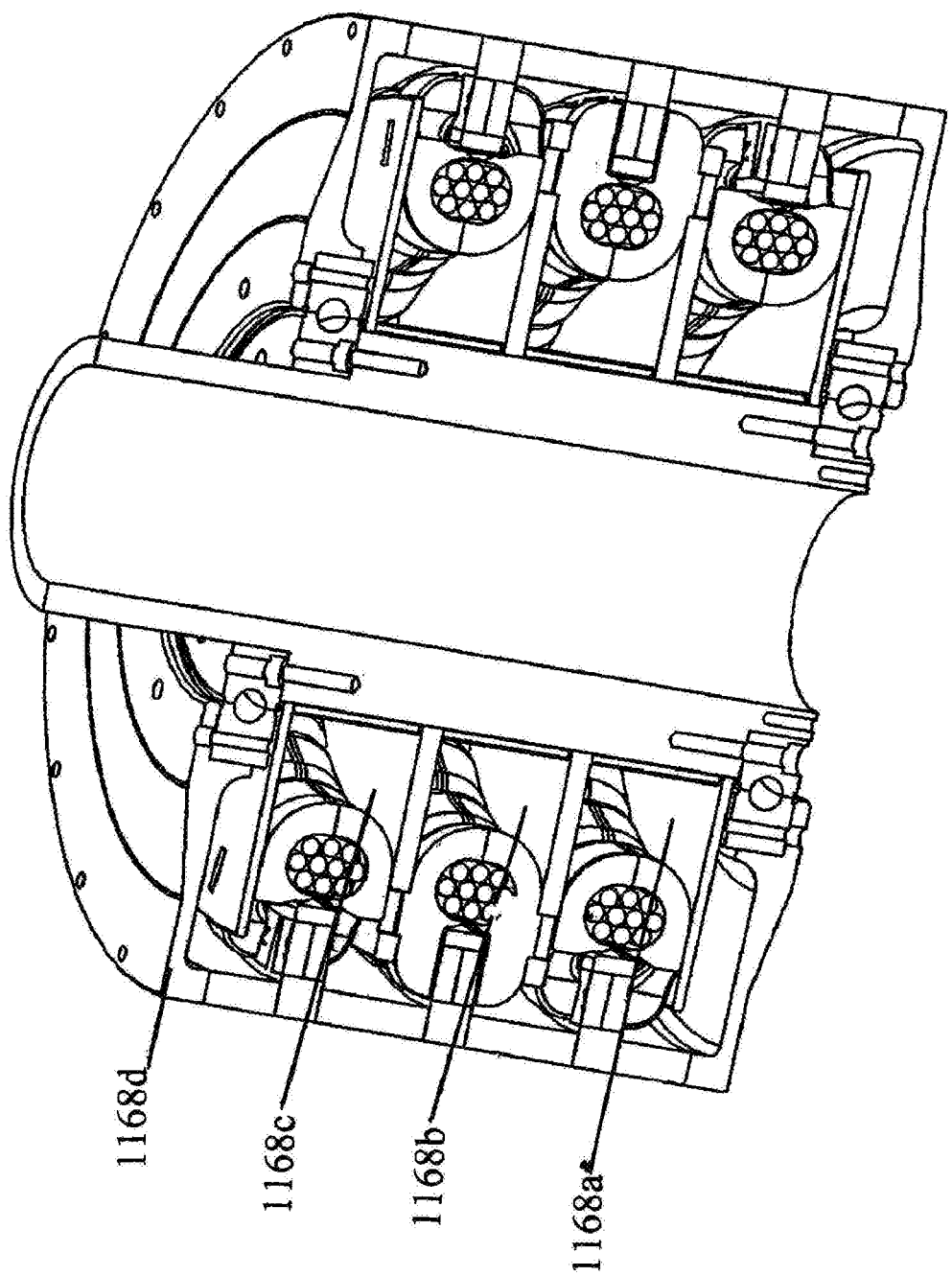
FIG. 1b is another cross sectional perspective view of a wheel motor shown in FIG. 1a with optional alignments plates.

FIG. 1a is a cross sectional perspective view of a wheel motor according to the present invention. As shown, the parallel pole motor 1100 includes non-rotating shaft 1140 which has a splined in the cylinder surface 1148 between the two bearings 1145 two rotating endplates 1161. As shown in FIG. 1b, optionally, the motor includes alignment plates 1168a, 1168b, 1168c and 1168d between adjacent molded magnetic flux channel pole pieces that mate with alignment keys 1206 that protrudes from the outer side of each molded magnetic flux channel pole piece 1210a and 1210b shown in FIG. 2b for aligning the pole pieces with the alignment plates 1168a, 1168b, 1168c and 1168d. As shown, the alignment plates separate the adjacent phases of the motor.

In a preferred embodiment, the parallel pole motor includes three rotor discs 1160 separated by rotor spacers 1180, two adjacent wide 1180a spaces and two narrow 1180b, one narrow spacer 1180b on each side of the two adjacent wide spacers 1180a. The motor includes a permanent magnet 1130 located between internal pole flat surfaces 1212 of pole pieces 1210 and a transverse wound stator winding 1120 running through the channel 1125 formed by plural adjacent pole pairs 1210. The void area between the mated molded magnetic flux channel pole pieces 1110 and the shaft can be filled with an epoxy 1190 or other suitable material as shown in FIG. 1a. The rotor uses similar rotating end plates as described in the '074 patent with end bearings around the non-rotating shaft assembly, and according to the present invention can be made of aluminum, fiberglass, or composite carbon fiber for light weight.

Figure 2B:
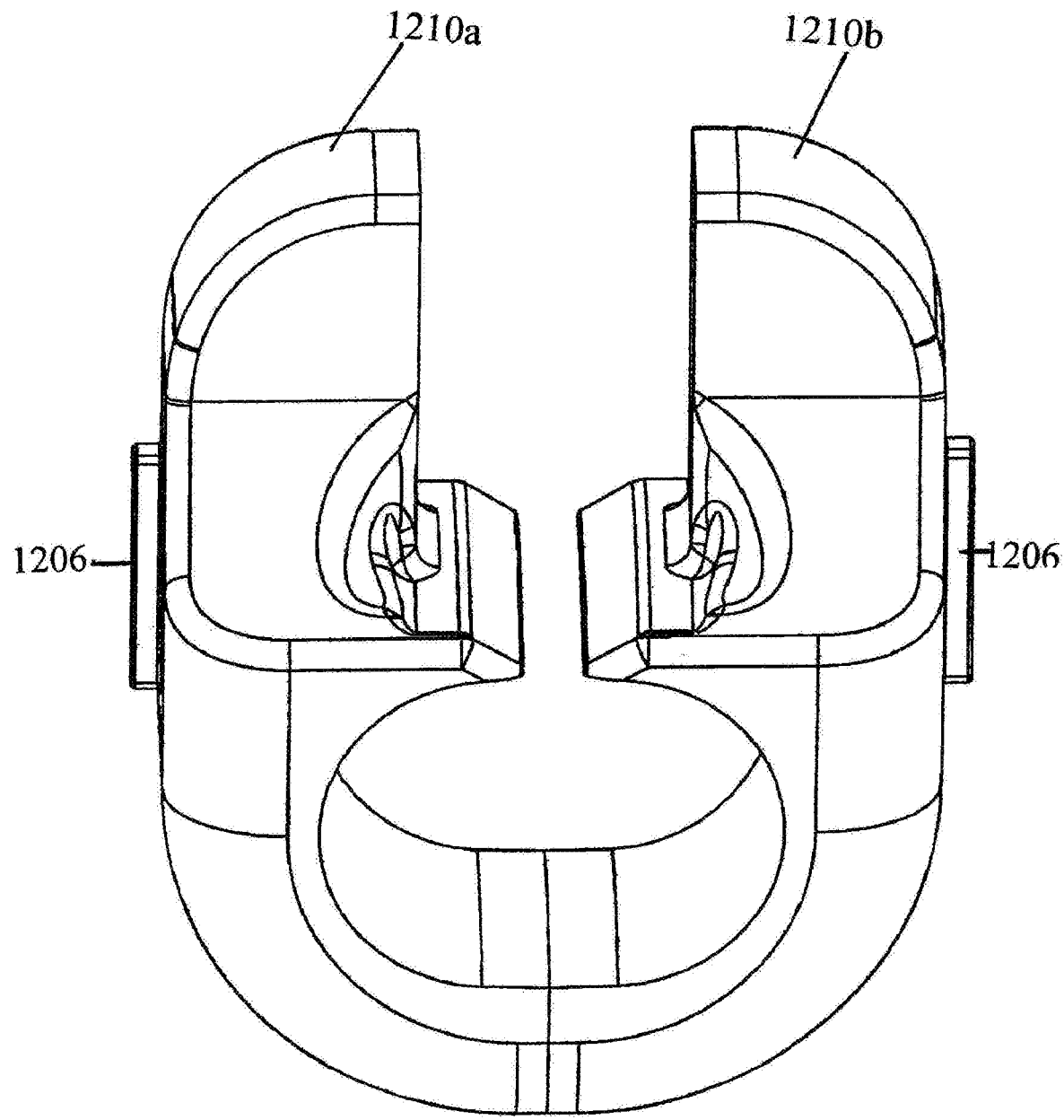
FIG. 2b is a perspective side view of mating molded magnetic flux channel pole pieces of FIG. 2a including optional alignment keys.

Inclusion of the alignment plates 1168a, 1168b, 1168c and 1168d shown in FIG. 1b, and corresponding alignment keys 1206 shown in FIG. 2b facilitate assembly of the motor and are used to locate, time and mount the stator molded magnetic flux channel pole pieces and to transmit the torque reaction to the non-rotating axle.

For the purpose of illustration and not limitation, the description of the parallel poles pieces includes mating north and south pole pieces although the pole piece can be formed as one single pole piece. The molded magnetic flux channel is are made in similar method as the '074 patent, except that the pole pieces are elongated and aligned to mate to the permanents magnets in the rotor in an axial air gap path rather than radial air gap path. The pole swept width is increased to approximately 1.25 times the swept width of the mating permanent magnets to improve torque and to improve the reverse EMF waveform. For fabrication of the molded magnetic flux channel pole pieces, in a preferred embodiment, they are pressed from a high magnetic permeability powder identified as "Arnold Magnetics Corporation five part alloy knows as 'Crystal X'". Alternative material will be obvious to those skilled in the art such as, but not limited to, construction from insulated iron wires wound on a forming mandrel and then potted in an epoxy base or with both insulated iron wires wound on a mandrel, then impregnated with Arnold Magnetics Corporation Crystal X material and then potted in an epoxy base.

The actual stator pole surface may be flat, convex or concave to yield the desired stator winding reverse EMF waveform of sine wave, square wave, or other desired waveform. Additionally, the total magnetic path is made as short as possible with careful improvements to the geometry of the MMFC.

The geometry of the molded magnetic flux channel is designed and refined to allow the maximum magnetic flux capture from the transverse stator winding, and to bend and focus the magnetic lines of force so that they are delivered in an approximately parallel path to the perpendicular pole piece surfaces. Since magnetic lines of force are not compatible with sharp angles, the corners of the pole pieces are radiused, and cross sections are gradually tapered to concentrate and guide (or channel) the magnetic flux.

The '074 patent used non-rotating stators which included molded magnetic flux channels and transverse wound stator coils, and an outer steel drum rotor with rows of bonded permanent magnets. The magnetic return path of the permanent magnets in the '074 patent is through the steel drum.

The present invention changes the shape of the molded magnetic flux channels so that the pole pieces have an axial slot to accommodate the rotor permanent magnet plus the two air gaps. Both sides of the rotor's permanent magnets are used, so there is no need for a magnetic return path for adjacent magnets. As a result, magnetic performance per pound of permanent magnet material is increased.

FIG. 2a is a perspective side view of mated molded magnetic flux channel pole pieces 1210a and 1210b. As shown, the wide lower portion of the mated pole pieces 1210a and 1210b connect at the base to form a channel 1125 for placement of the transverse wound stator winding 1120. The radius of the channel 1125 is the flux capture and containment perimeter, which encircles greater than approximately 90% of the winding 1120. The interior side surface if each pole piece 1210a and 1210b in the center area of the mated pole pieces 1210 above the channel 1125 are separated by an isolation gap 1240 to minimize the flux fringing loss. As shown in FIG. 2a, the isolation gap 1240 between mated pole pieces is smaller than the diameter of the transverse winding channel 1125.

The upper portion of each pole piece 1210a and 1210b includes internal flat surfaces 1212a and 1212b that are approximately parallel and external sides of the upper portion that are curved by a flux focus angle of a focused area 1218 designed as a third deflection to focus flux. The upper portion of each pole piece includes four deflection areas, two on the interior side surface (1214 and 1216) and two on the outer side surfaces (1218 and 1219) for focusing the magnetic flux.

Figure 4:
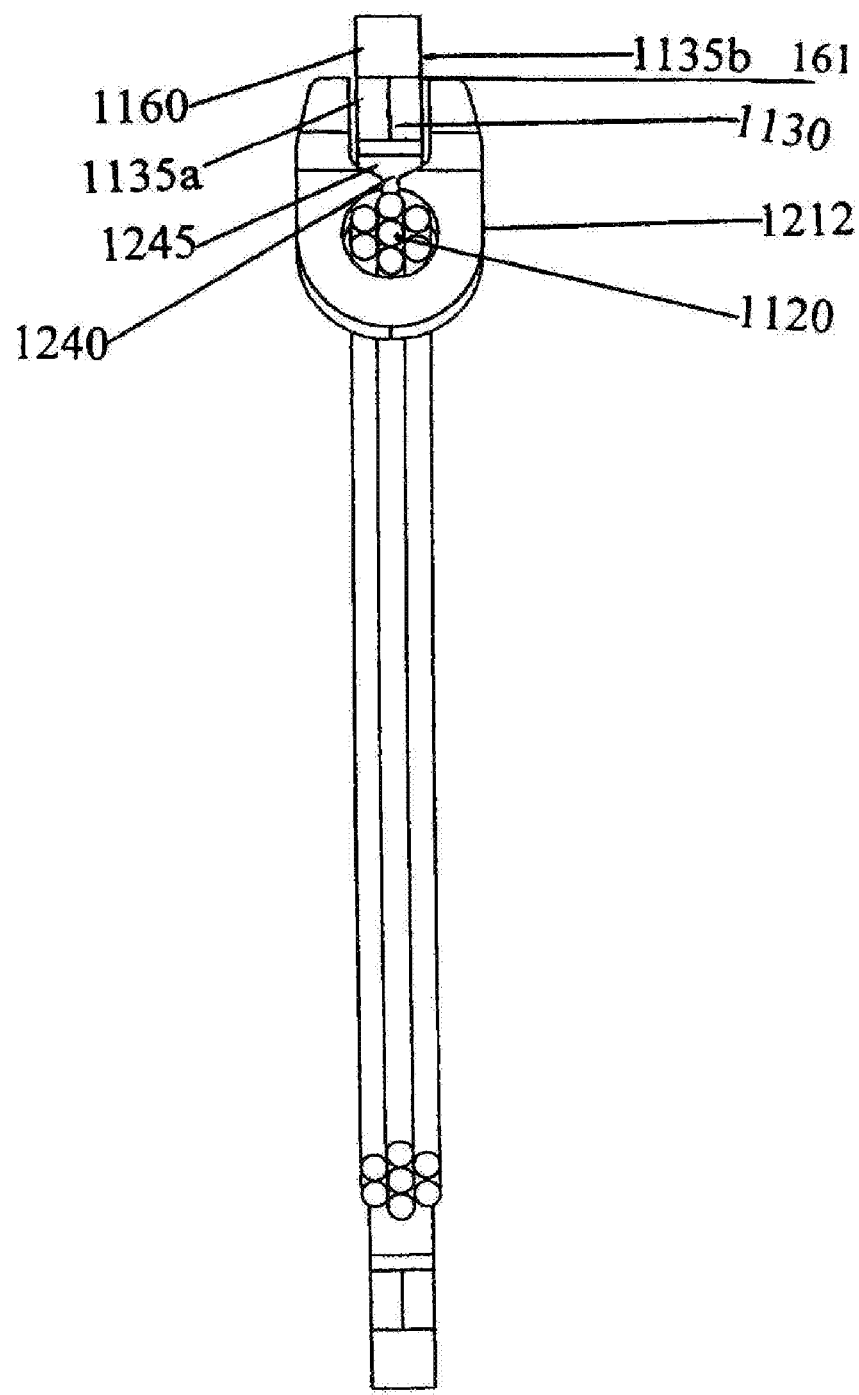
FIG. 4 shows an end cutaway drawing of a Rotor Disc, surrounded by mated molded magnetic flux channel pole pieces and a corresponding transverse wound stator coil.

Referring to FIG. 2a in conjunction with FIG. 4, the internal flat surfaces 1212a and 1212b are separated by a distance sufficient to accommodate the rotor and permanent magnet 1130 with an air gap 1135a and 1135b between each side of the permanent magnet 1130 and the corresponding one of the internal flat surfaces 1212a and 1212b. Below the internal parallel flat surfaces 1212 and above the isolation gap 1240 is a curved section of the internal side surface forming the base of the magnet placement area forming a magnetic flux focus angle shown in FIG. 2a as two sections, 1214a and 1216a. Sections 1216a and 1216b are angled to provide a first deflection while sections 1214a and 1214b are curved to provide a second deflection of the magnetic flux captured by the mated pole pieces 1210a and 1210b. Together they provide an isolation shaped open area between the lower edge of the magnet 1130 and the transverse winding channel 1125.

Figure 3:
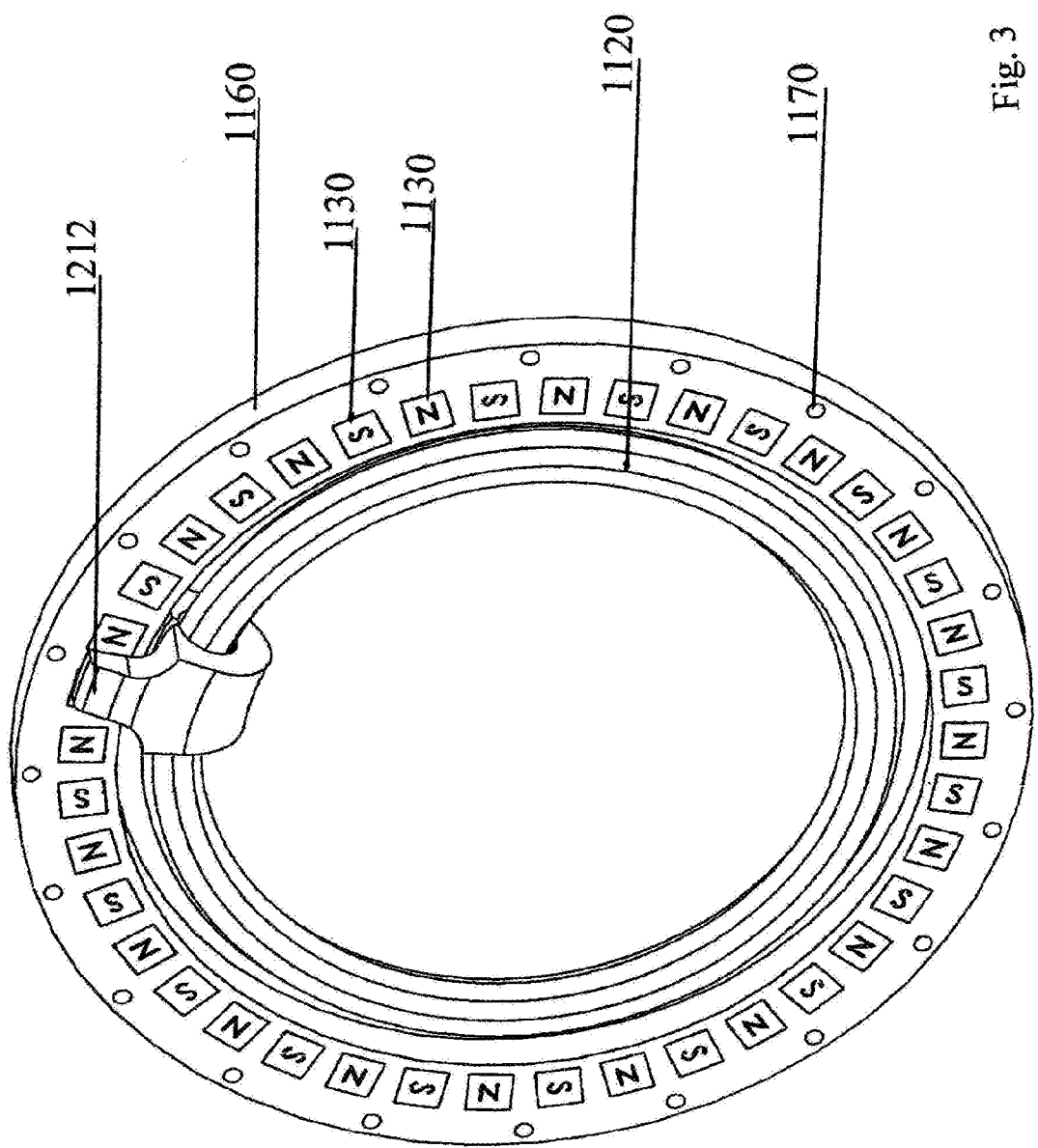
FIG. 3 shows an isolated rotor disk assembly showing the relationship between the bonded magnets, one pair of mating molded magnetic flux channel pole pieces and one transverse wound stator winding.

FIG. 3 is a perspective side view of the isolated rotor disk 1160 assembly showing the relationship between the bonded magnets 1130, one pair of mating molded magnetic flux channel pole pieces 1212 and one transverse wound stator winding 1120. The permanent magnets 1130 are flush mounted and bonded into slots which can be abrasive water jet machined into a plastic or composite material rotor discs. The plural permanent magnets 1130 can be bonded in place within the rotor disc 1160, alternating in polarity between north and south, with each permanent magnet separated from adjacent permanent magnets by a distance. The spacing of the permanent magnets is increased to at least approximately 1.25 times the swept width of the magnet in order to reduce fringing losses. Although not shown, it is understood that each permanent magnet has a north end and a south end. In the preferred embodiment, the north and south polarity ends of the permanent magnets alternate around each side of the rotor disc 1160 with one end of the permanent magnets 1130 exposed on each side of the rotor disc 1160. The rotor disc also includes alignment and or fastener holes 170 closer to the outer circumference of the rotor.

Functionally, FIG. 3 shows an example of a mated parallel pole magnetic flux pole piece 1210 with the transverse winding 1120 running through the channel 1125. During rotation, each one of the mated pole pieces 1210a and 1210b passes over opposite ends, thus opposite polarities, of the same permanent magnet 1130. As previously described, the permanent magnet 1130 is positioned between adjacent parallel flat surfaces 1212a and 1212b shown in FIG. 2a.

FIG. 4 shows an end cutaway side view of the rotor disc shown in FIG. 3. As shown, the lower side surface of the rotor disc 1160 housing the permanent magnets 1130 is surrounded by mated molded magnetic flux channel pole pieces 1210a and 1210b and a corresponding transverse wound stator winding 1120. The isolation gap 1240 between mated pole pieces above the channel 1125 and the isolation space 1245 between adjacent magnetic flux deflection surfaces 1214a and 1216a and mating magnetic flux deflection surfaces 1216a and 1216b. FIG. 4 also shows the air gaps 1135a and 1135b between the permanent magnet 1130 and the mated pole pieces 1210a and 1210b.

For manufacturing purposes, the rotor disc is a non-metallic such as a plastic rotor disc with magnet cavities or holes cut in the plastic disc for inserting the magnets with one polarity of the magnet flush with one side of the rotor disc and the opposite polarity flush mounted with the opposite side of the rotor disc. The magnets can be Neodynium-irom-boron permanent magnets inserted in the rotor disc magnet cavity cut out by a numerically controlled water jet abrasive cutter. Alternatively, those skilled in the art will understand that alternative materials can be used to fabricate the rotor disc such as, but not limited to, a composite material rotor disc of fiberglass or carbon fiber matrix, fitted with alternate pole Neodymium-boron-iron permanent magnets, in which the magnet cavity in the material is water jet machined. The permanent magnets are flush mounted and are bonded in place with epoxy or with cyanoacrylate anaerobic adhesives. In a preferred embodiment, the flush mounted neodymium-iron-boron permanent magnets have radial spacing of at least 25% of the pole average face radial dimension.

For assembly purposes into the complete motor generator, in a preferred embodiment the rotor discs can be split into two or more identical segments and are joined together when the discs are assembled into the stator pole slots in the molded magnetic flux channels pole pieces. Additionally, the rotor disc spacers shown in FIG. 5 can be fabricated in split circles so that they can be assembled between the completed Rotor Disc Assemblies after being mated to the Stator Assembly. They are then fastened together with through bolts or can be bonded together.

Unlike the '074 patent, the present invention replaces the outer steel drum with a built up stack of rotor disc assemblies and spacers. The spacers can also be split into two or more segments for later assembly in a complete circle. For assembly, fasteners are used to bolt the stack to the end plates for a complete rotor assembly. Alternatively, the complete assembly may be bonded together. The number of rotor discs can be one or more. One embodiment uses three rotor discs mated with three stator assemblies operating from three phase electrical input. Another embodiment of this invention uses a single rotor disc assembly, surrounded with three partial stator assemblies. The single rotor disc embodiment produces less weight, less torque, and higher speed, and is suited for lighter weight wheel motors.

Figure 5:
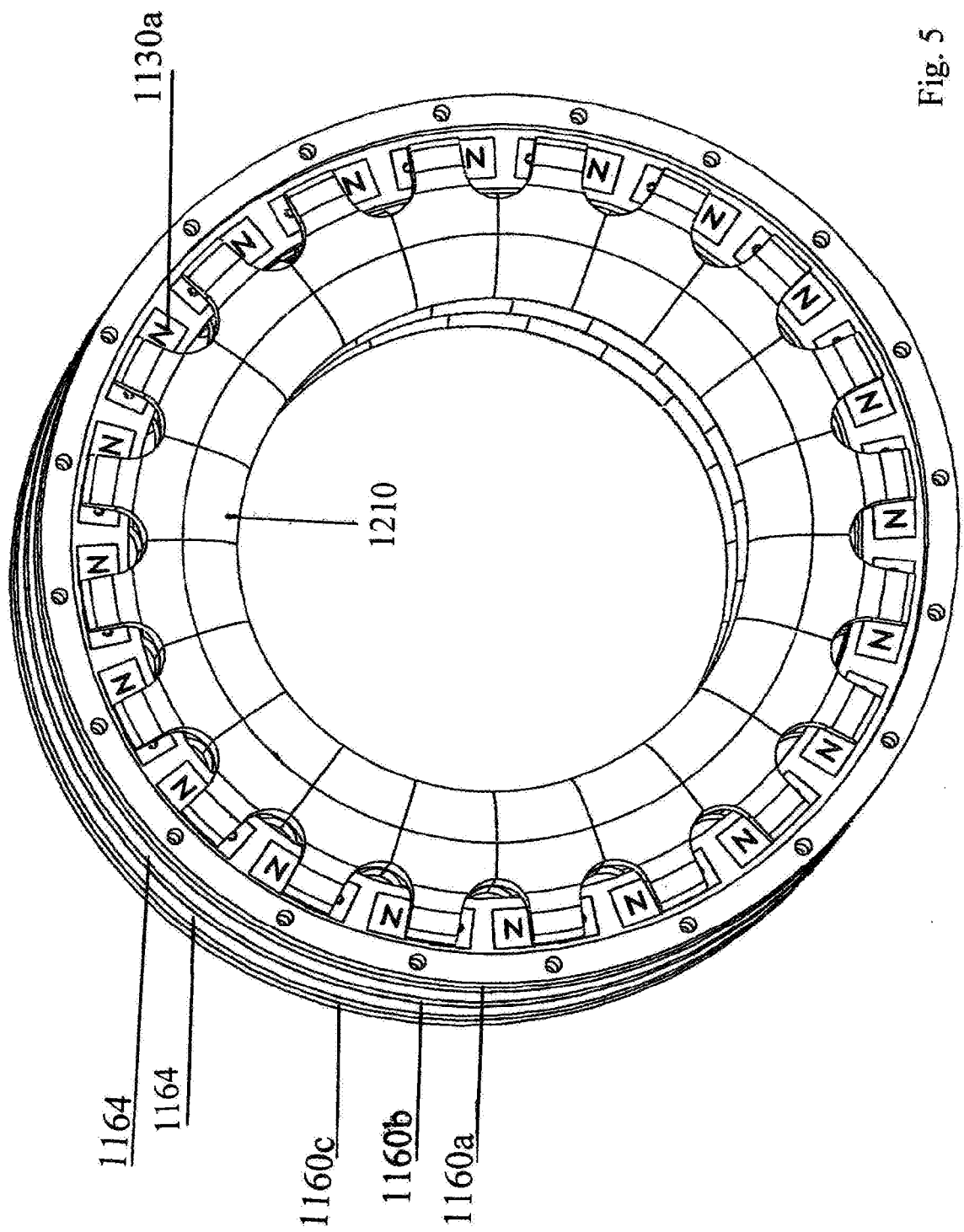
FIG. 5 shows a partial assembly including three stator assemblies, three rotor discs and two spacers with an electrical offset of approximately 120 electrical degrees.

FIG. 5 is a perspective side view showing a partial assembly of a three stator assembly including three rotor discs 1160a, 1160b and 1160c and two spacers 1164 with an electrical offset of approximately 120 electrical degrees. FIG. 5 also shows a perspective view of plural adjacent mated magnetic flux pole pieces 1210 forming a ring for housing the transverse winding 1120. As described in the parent '079 patent, in the three phase version of the present invention, either the stators may be offset 120 electrical degrees with the magnet aligned or the motor magnets may be offset 120 electrical degrees with the stators aligned. Mechanically, the offset depends on the number of poles per the following formula.

Offset=number of pole pairs/360×number of phases.

Thus for a 60 pole motor with three phases:

Offset=360/30=12 degrees divided by 3=4 degrees

Figure 6:
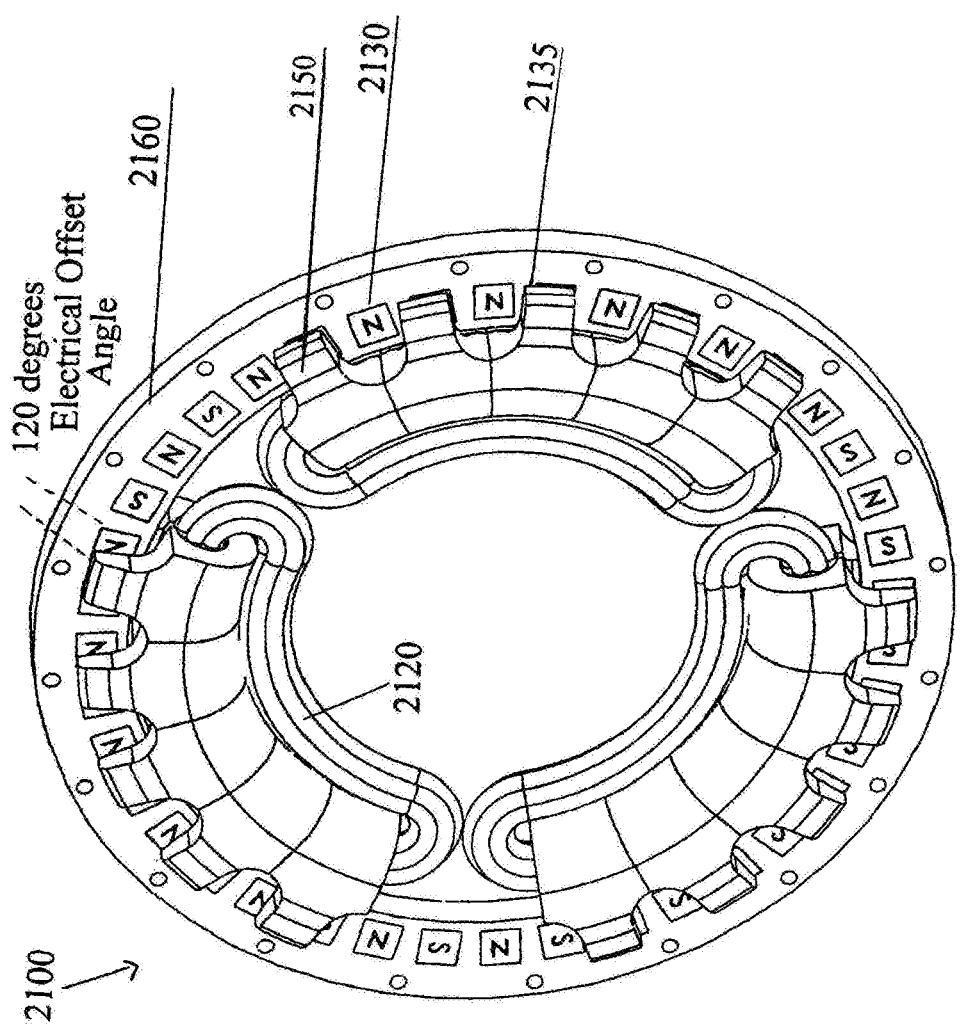
FIG. 6 shows an alternate embodiment using a 40 pole, single rotor disc assembly with three individual phase stator assemblies of five pairs of mated molded magnetic flux channel pole pieces, each individually transversely wound with foldback return windings.

FIG. 6 is a perspective side view showing an alternate three phase motor 2100 embodiment using a 40 pole, single rotor disc 2160 assembly with three individual phase stator assemblies of five pairs of mated molded magnetic flux channel pole pieces, each individually transversely wound with foldback return windings. Similar to the previous embodiment, the rotor disc 2160 includes plural permanent magnets 2130 alternating in polarity.

Each phase includes a set of magnetic flux pole pieces 2150 that form the transverse winding channel 2125 for housing a corresponding transverse winding 2120 that "folds back" forming the return segment of the transverse stator winding 2120 that is not housed within the winding channel 2125. In this embodiment, the path of the transverse winding travels through the transverse winding channels in the molded magnetic flux pole pieces and returns folded back against the base of the molded magnetic flux pole piece, so that the magnetic flux of the foldback return is also captured into the molded magnetic flux pole piece. Each of the three partial stators are separated from each other, both magnetically and electrically. The electrical offset angle in this example is approximately 120 degrees.

Figure 7A:
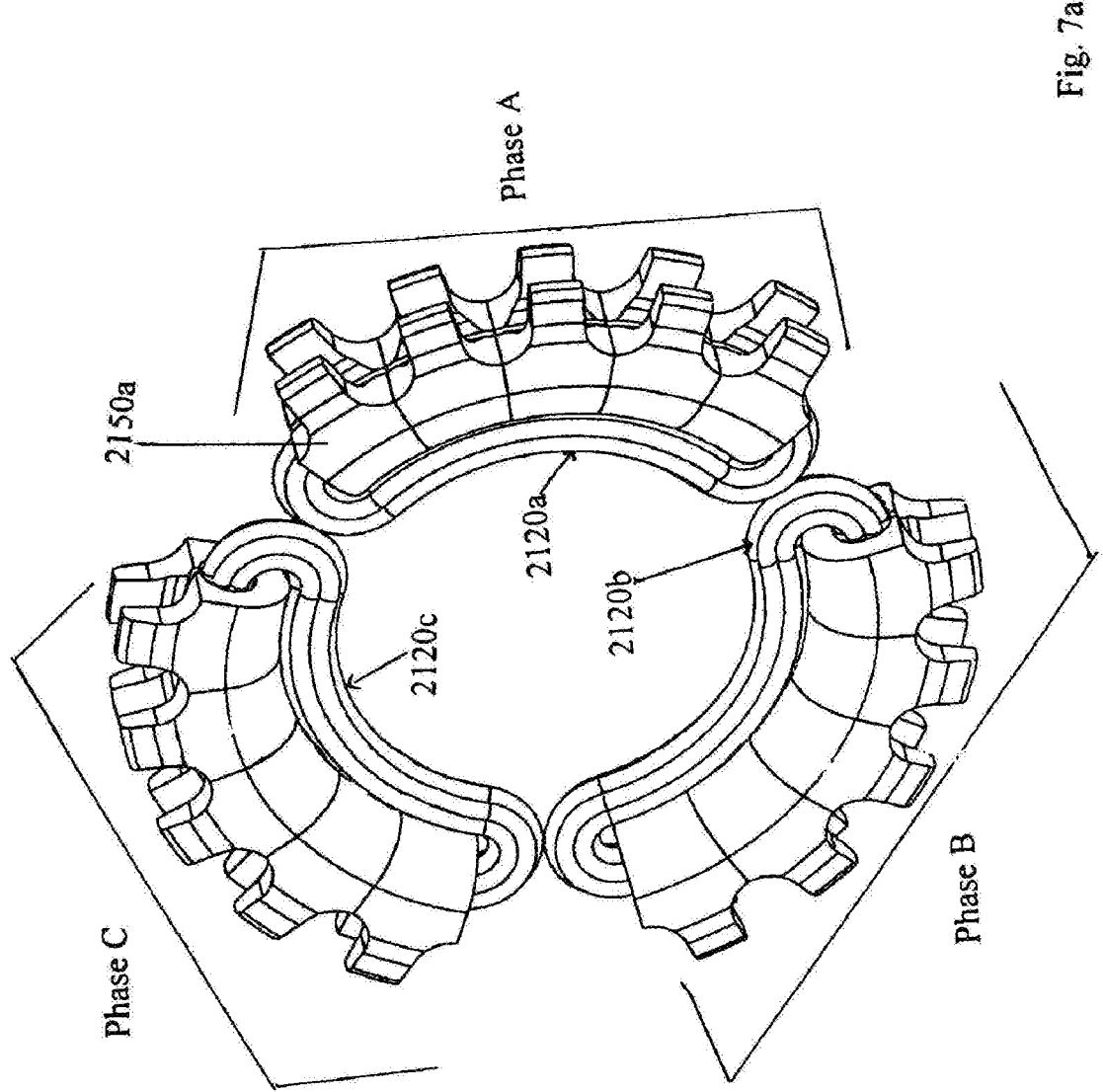
FIG. 7a is a perspective view of the three segmented stator assemblies with simplified transverse wound with foldback windings.
Figure 7B:
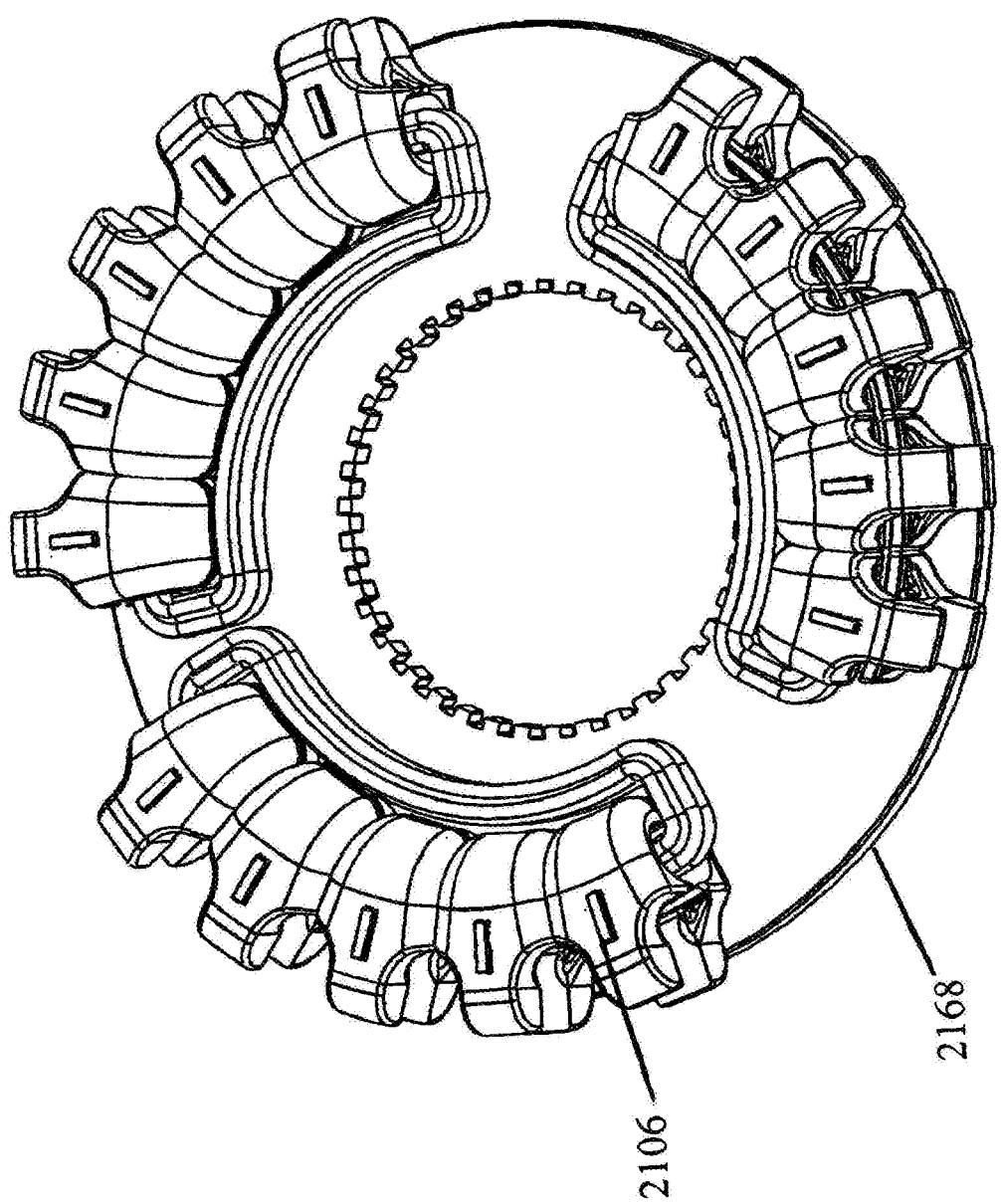
FIG. 7b is another perspective view of the three segmented stator assemblies shown in FIG. 7a with optional alignment disc and corresponding alignment keys.

FIG. 7a is a perspective view of the three segmented stator assembly shown in FIG. 6 showing three sets of molded magnetic flux pole pieces 2150a, 2150b and 2150c each having a separate simplified transverse wound stator windings 2120a, 2120b and 2120c with exposed foldback segments completing the electrical path. The perspective view shown in FIG. 7a clearly shows the space between mated pole pieces for the permanent magnets 2130 shown in FIG. 6. FIG. 7b is another perspective view of the three segmented stator assemblies shown in FIG. 7a with optional alignment disc 2168 and corresponding alignment keys 2106. As shown, the transverse wound stator molded magnetic channel pole pieces are keyed in place with the alignment disc 2168 on the same axis having, in this example, an offset for the stators segments of approximately 120 electrical degrees.

Figure 7C:
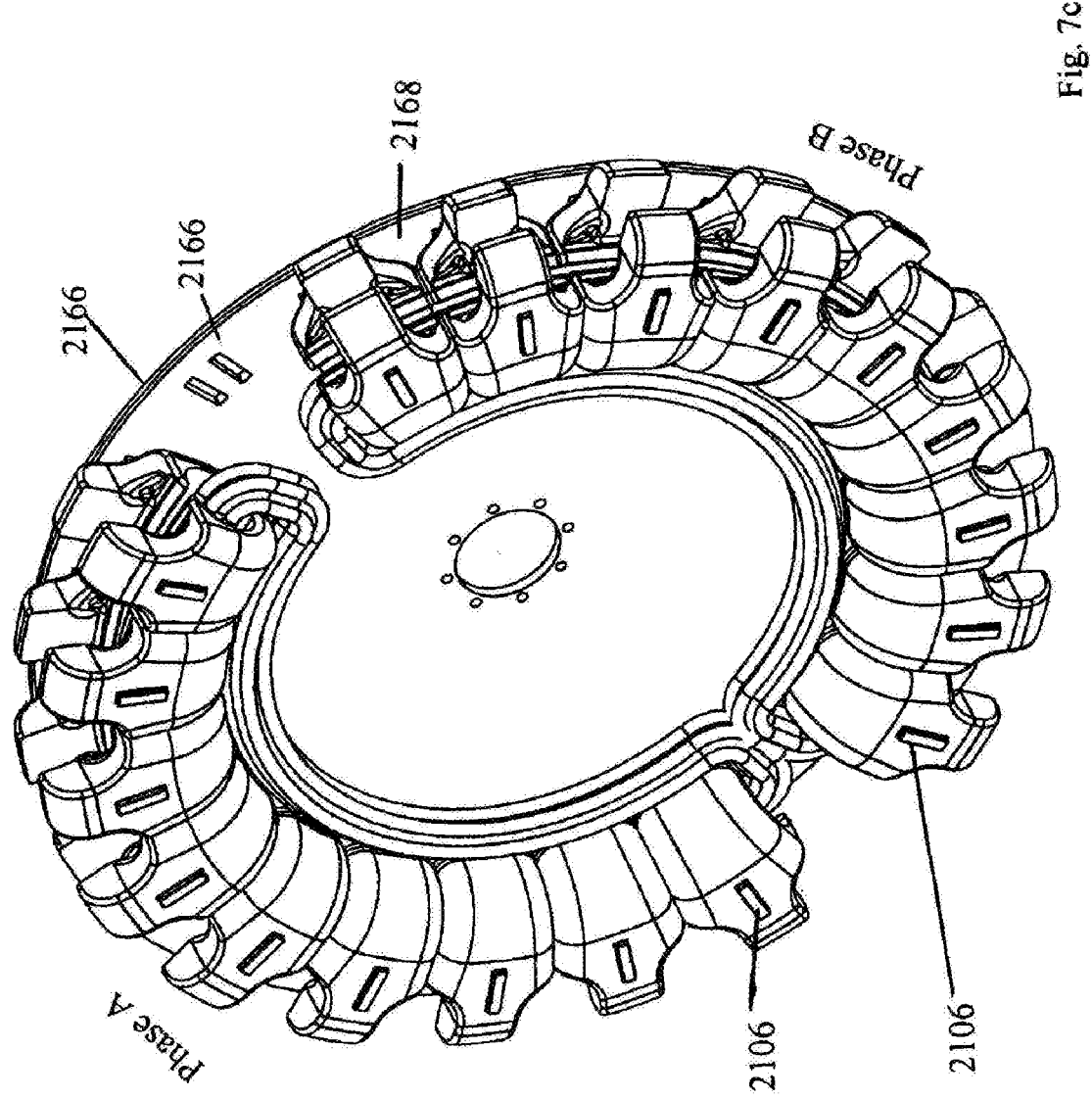
FIG. 7c shows a perspective view of the two segmented stator assemblies with optional alignment disc and corresponding alignment keys.

In the example shown in FIG. 7c, the transverse wound stator molded magnetic channel pole pieces are keyed in place with by inserting the alignment keys 2106 with the alignment slots 2166 in the alignment disc 2168. In the example shown, the partial stators for phase A and phase B have an offset for the stators segments of approximately 90 electrical degrees from each other axially on the same plane.

While it has long been known that the best voltage waveform to efficiently drive a permanent magnet motor is quite different with different speeds and power loadings, an effective means of varying the timing and waveform has not previously been known. Because of the finite time required to build a magnetic field, the required voltage must be applied sooner (more advance) as the motor speed increases. The optimal waveform can vary from DC at stall, to a square wave at low speed and to a modified sine wave at higher speed.

In the 19th century George Henry Corliss discovered with steam engines, that 30% more efficient operation resulted from shutting off the steam earlier in the power cycle and allowing the steam to further expand within the cylinder. Similarly, in the inductive load in the stator of a permanent magnet motor, it is desirable to cut off the applied voltage earlier in the working cycle of the stator, and allowing the captured decaying magnetism to continue working in the electrical cycle without additional energy input.

The present invention includes a novel method of selecting the timing and optimal applied voltage waveform for approximately all speed ranges and power ranges. The optimal timing and waveform in the preferred embodiment was determined by careful calibrated testing of prototypes and the resulting data is stored in non-volatile memory for future use. According to the present invention, feedback information to the central processing unit confirms and allows "on-the-fly" corrections to be made in the voltage waveform applied to the motor's stator coils during operation. The motor driving electronics provide full wave current conduction at stall to low speeds, transitioning to double-acting limited current conduction angle at high speed.

Figure 8:
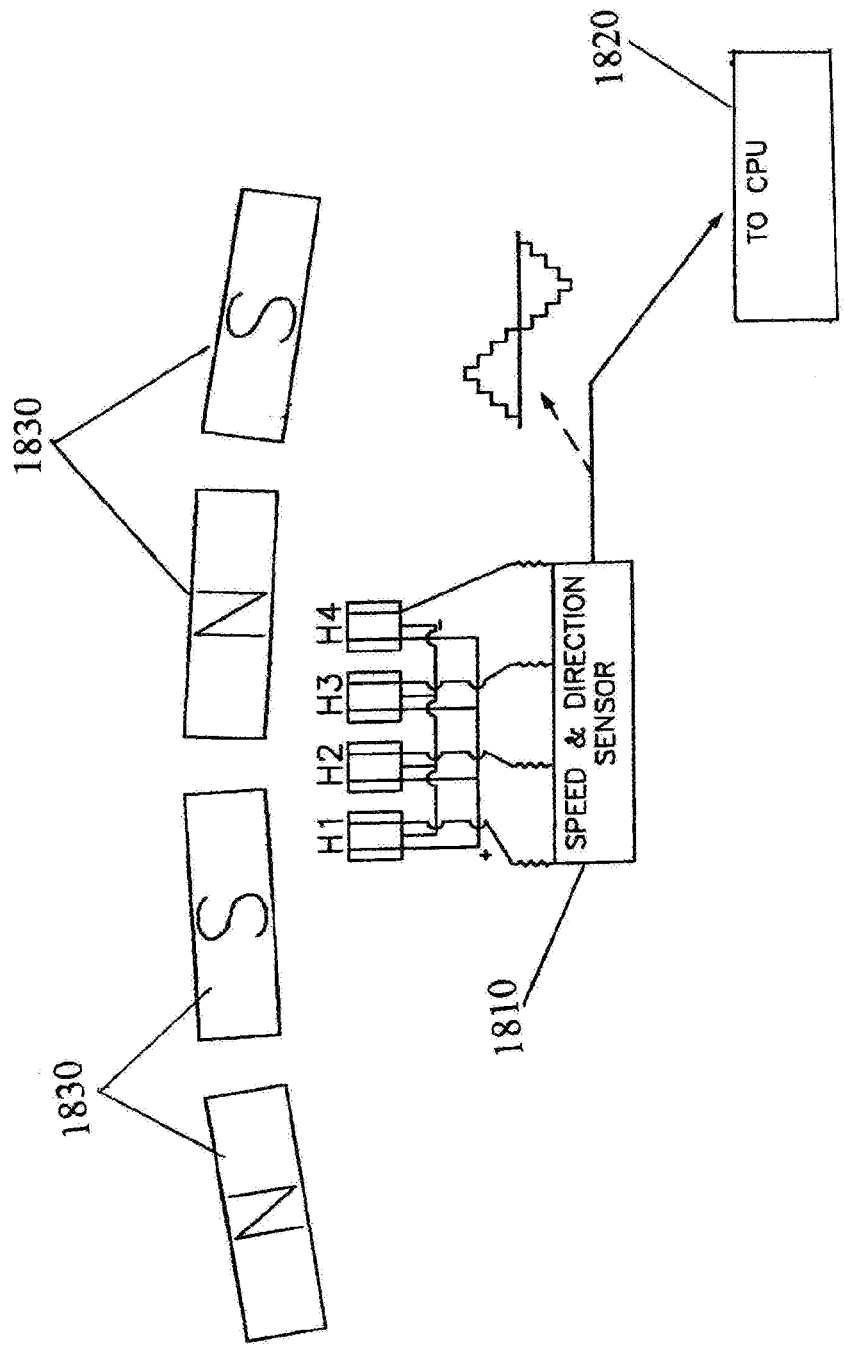
FIG. 8 shows a timing, direction and speed magnetic flux detector. In one embodiment, a plurality of detectors are positioned near the plane of the rotor magnets to accurately measure, the timing, speed and direction of movement of the Rotor.

The driving electronics to drive the motor utilize timing, direction and speed magnetic flux detectors. FIG. 8 shows an example of a timing, direction and speed magnetic flux detectors 1810 according to a preferred embodiment of the present invention. Those skilled in the art of electronics will understand that alternative devices for be substituted for detecting the timing, speed and or direction of the rotor such as optical detectors. In a preferred embodiment, the magnetic detection module includes a plurality of ratiometric, balanced null Hall Effect sensors in close proximity to one another. In the example shown, four to sixteen individual sensors can be used although four are shown, labeled as H1, H2, H3 and H4 in figures for clarity.

As the magnetic field of a north pole magnet approaches the magnetic detection module 1810, sequentially each sensor's output changes from a midpoint voltage to a full positive voltage. The outputs are combined with summing resistors. As the sensors H1-H4 switch to full on, the first 90 degrees of the first 90 degrees of the stair step sine wave shown in FIG. 8. As the magnetic field of the north pole magnet passes away from the module 1810, one by one the sensors H1-H4 switch to mid voltage again. This creates the second 90 degrees of the stair step sine wave.

Then, as the adjacent south pole of the magnet approaches, each of the sensors H1-H4 is sequentially switched to zero voltage. This creates the third 90 degree portion of the stair step sine wave. And finally, as the south pole of the magnet moves away from the module 1810, each sensor H1-H4 is switched to mid voltage position, generating the final 90 degree portion of the stair step sine wave. The stair step sine wave output from each module is fed to the controller 1820 central processor unit (CPU), which provides accurate information of speed, direction and a choice of timing advance signals.

Figure 9:
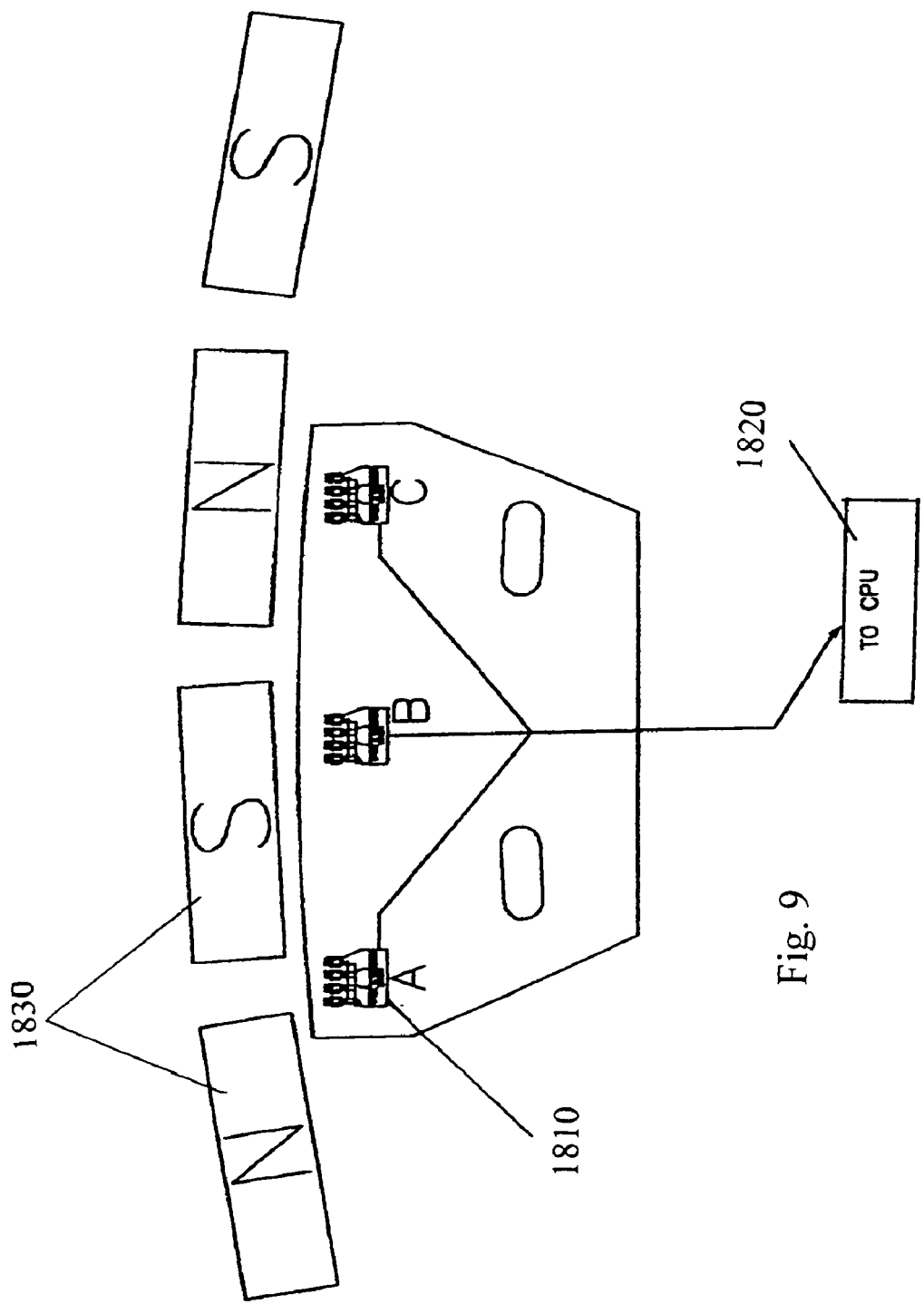
FIG. 9 shows three timing, direction and speed magnetic flux detectors positioned at approximately 120 electrical degree spacing and mounted on a moveable plate to allow for manual timing adjustments.

In the embodiment shown in FIG. 9, a plurality of the timing, direction and speed magnetic flux detectors 1810 are positioned near the plane of the rotor magnets 1830 to accurately measure the timing, speed and direction of movement of the rotor to determine feedback data for "on-the-fly" corrections. FIG. 9 shows three timing, direction and speed magnetic flux detectors positioned at approximately 120 electrical degree spacing and mounted on a moveable plate to also allow for manual timing adjustments.

Figure 10:
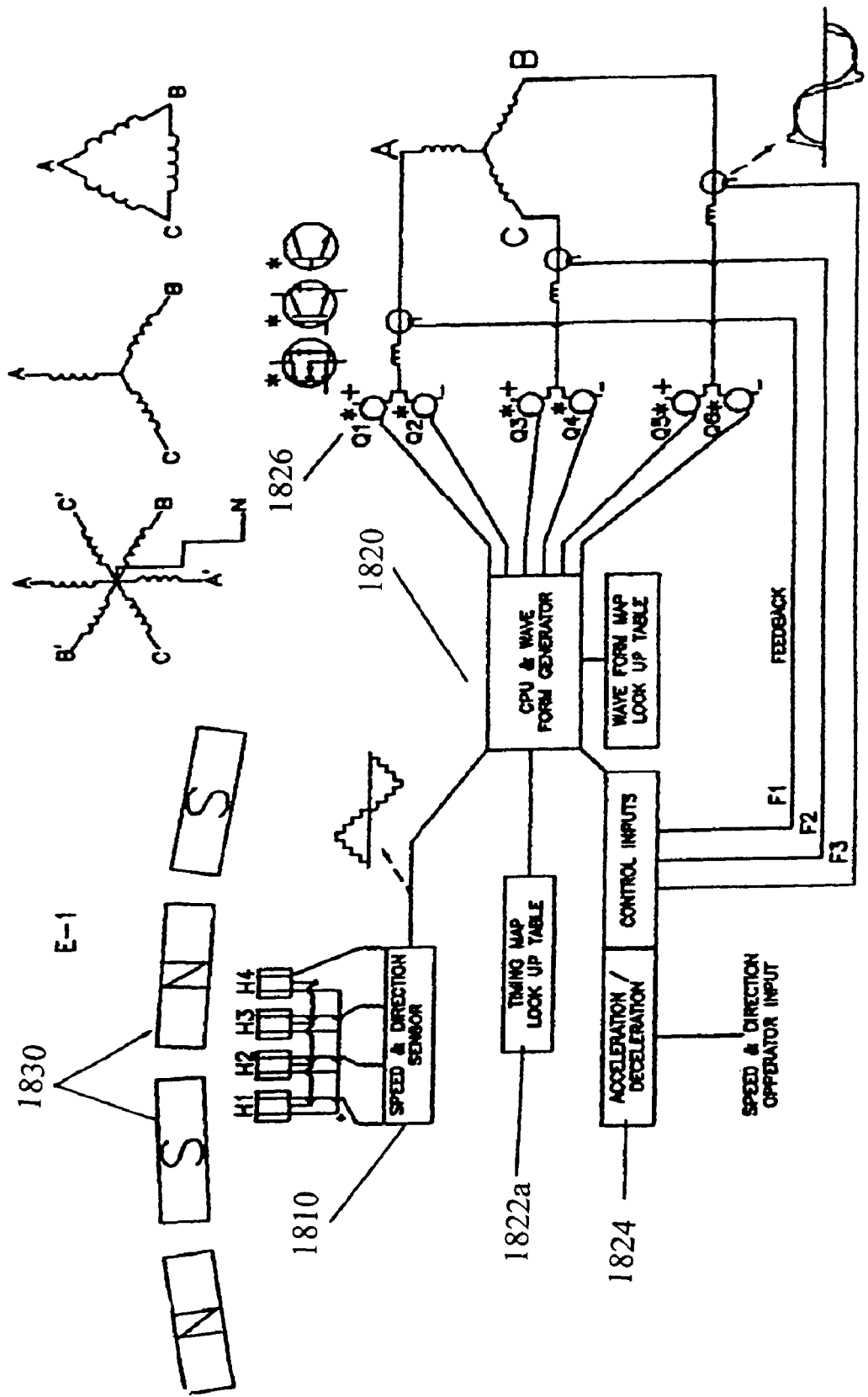
FIG. 10 is a block diagram of the electronic control of the motor with the stator windings in a Wye or Delta configuration.

The detected data is transmitted to the central processing unit within the controller 1820 for processing to determine the timing and optimal voltage waveform to be applied to the motor for the desired speed and power during operation. As previous described, a database containing optimal timing and waveform data corresponding to desired operation is stored in nonvolatile memory as a timing map lookup table 1822a and a waveform map look up table 1822b as shown in FIG. 10. The detector data can be used to compare the detected data with the stored optional voltage and waveform data for compensation or feedback data for "on-the-fly" corrections.

The controller's 1820 central processing unit also receives input signals from the speed and direction user controls, the magnetic motion detectors, the current feedback sensors and other safety sensors. The central processing unit is coupled with a digitally stored data look up table 1822a and 1822b. The waveform look up table 1822b contains a selection of optimal waveforms, digitally stored, for various speed, direction, and power ranges. The acceleration/deceleration table 1824 contains digitally stored, optimal rates for increasing or decreasing speeds. The timing look up table 1822a contains, digitally stored, optimal timing advance values for various speeds, accelerations, and power levels. The waveform lookup table can be stored in flash memory and be updateable.

After determining the desired speed, direction, and acceleration for the motor, the CPU downloads the optimal waveform, timing, required, and generates the plurality of phase signals to drive the switching transistors 1826 with an appropriate pulse width modulated waveform. This waveform is appropriate for the RPM and power level selected by the operator input device. The switching transistors 1826 may be Silicon Carbide MOSFETS, IGBT's, GaS, or other commercially available devices; In one embodiment, Silicon Carbide MOSFET's are preferred so that higher switching frequencies may be used, in addition to the lower switching losses for this device. The higher switching frequencies also enable more effective high frequency filtering.

Figure 11:
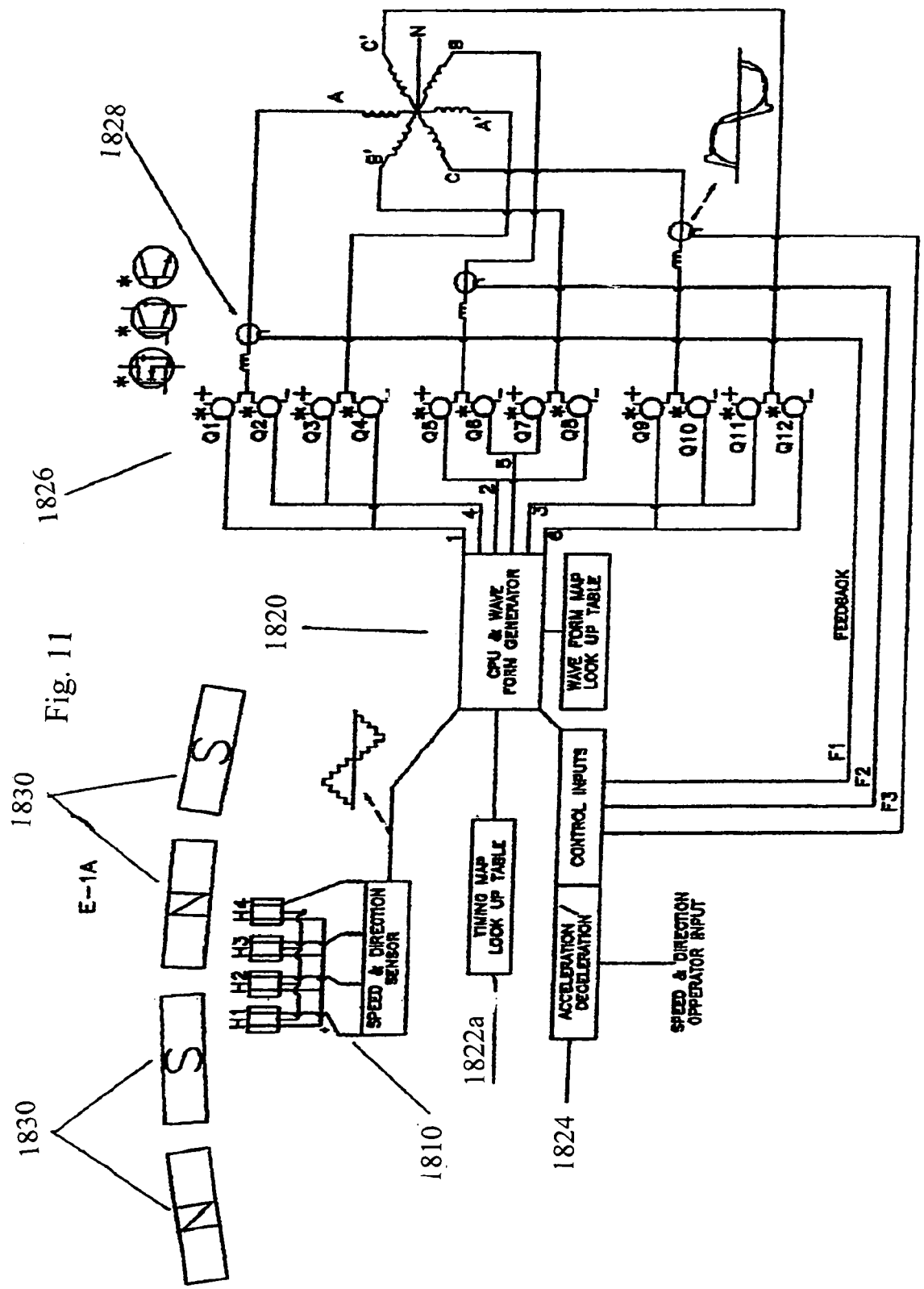
FIG. 11 is a block diagram of the electronic control of the motor with the stator windings in a STAR configuration.

The electronic Control of the Motor is quite different than conventional means. The Motor may be connected in Wye, Delta or Star arrangement. Wye or Delta connections can be driven by the same electronic arrangement, and Star requires a different arrangement. FIG. 10 is a schematic block diagram of the electronic control of the motor with the stator windings in a Wye or Delta configuration. FIG. 11 is a schematic block diagram of the electronic control of the motor with the stator windings in a STAR configuration.

As shown in FIGS. 10 and 11, an LRC filter 1828 is fitted to the outputs of the switching transistors 1826 to remove harmful switching AC noise prior to the output waveform being fed to the stator coils of the motor. This reduces degradation of the magnetization saturation characteristics of the molded magnetic flux channel pole pieces, reduces hysteresis losses in the magnetic materials increases torque and efficiency. Motors connected in either Wye or Delta configuration can be driven from electronics using six switching transistor circuits as shown in FIG. 10, while motors connected in Star configuration require additional components as shown in FIG. 11. Circuitry is similar except for additional transistor switches, a power supply having an positive, negative source and neutral voltage supply.

After filtering, the outputs of the switching transistors are fed to the appropriate motor Stator Windings. Feedback is provided to the CPU by current and waveform detection modules 1810 which can be either Hall effect devices or current transformers. Current and waveform feedback are used to modify the driver outputs of the CPU to allow for current limiting, waveform repair, switching transistor temperature limiting, short circuit limiting, and other typical safety limitations.

In the star configured embodiment shown in FIG. 11, where a higher speed motor operation is required, an over running fly-forward diode is placed in series with each power semiconductor switch so as to allow the motor's top speed reverse EMF to greatly exceed the available driving power supply voltage. In this embodiment, the conduction waveform of each power semiconductor is restricted to that portion of the cycle in which the power supply voltage exceeds the reverse EMF of the stator winding. Above that voltage, the over running fly-forward diode allows the remainder of the increasing voltage waveform to free wheel in disengaged mode. With the power semiconductor switches and series connected over-running fly-forward diodes in the driving electronics the driving voltage waveform powers the stator coil from zero to the maximum available from its power supply and which allows the waveform voltage to continue to rise above available voltage in free-wheel fly-forward mode.

In an embodiment, the power semiconductor switches feeding their respective stator windings are switched on and off one pulse for each half electrical cycle, feeding the appropriate voltage waveform to each individual phase winding from the output of a series voltage regulator. When power semiconductor switches feeding their respective stator windings are switched on and off one pulse for each half electrical cycle, the pulse and duration can be varied to control the motor speed and torque.

The over-running fly forward diodes also permit higher efficiencies because reverse conduction is blocked, this eliminating otherwise wasted energy; hysteresis losses from high frequency switching is more easily filtered out and therefore less heat is transferred into the stator windings and the magnetic circuit; and only DC or pulsating DC is furnished to the stator windings, at the appropriate timing of polarity, while the AC from pulse width modulation PWM is rectified and filtered, thus producing more torque with less heating.

The overrunning mode is applicable to embodiments such as highway operated wheel motors in which high cruising speeds trade higher speed for maximum torque, wherein at low speeds full torque is needed and available while not operating in over running mode.

Figure 12:
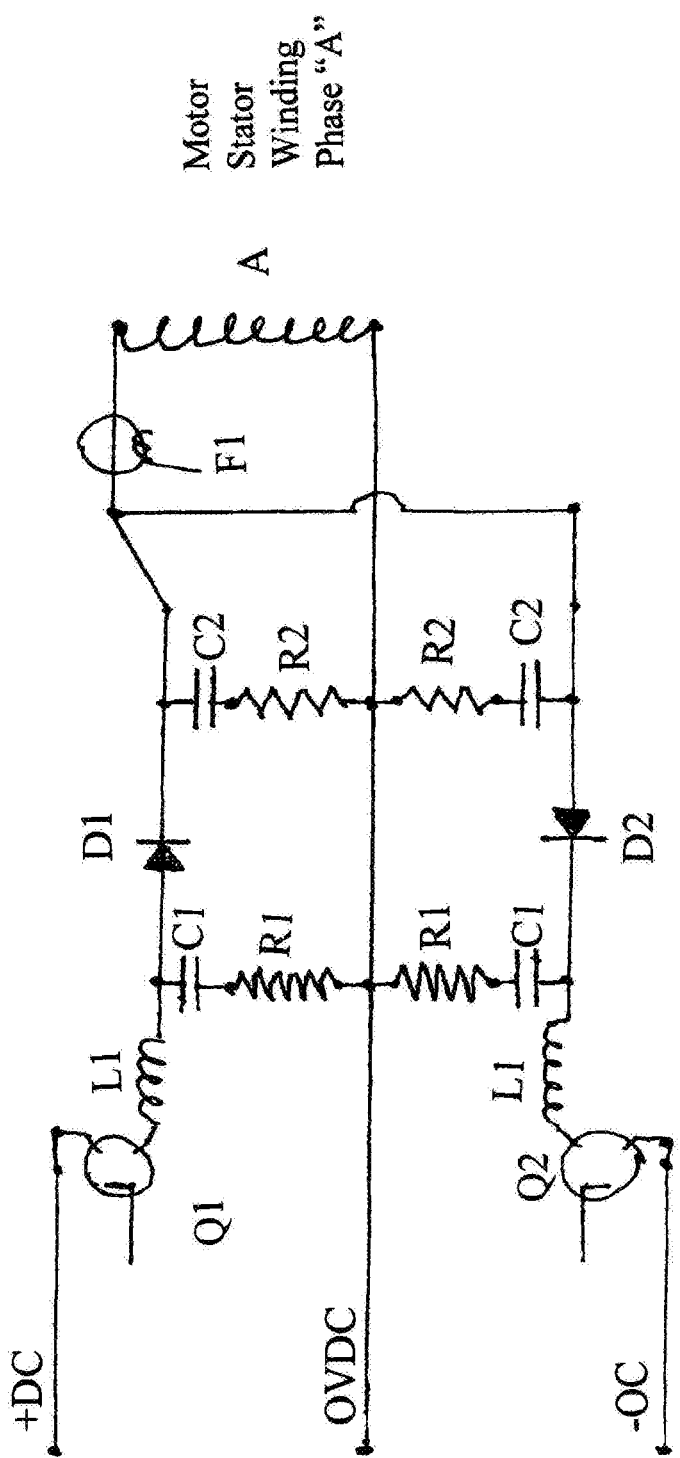
FIG. 12 is a block diagram of one output stage when the motor with the stator windings are configured in Star configuration.

FIG. 12 is a block diagram of one output stage when the motor with the stator windings are configured in Star configuration, showing the connection to one leg of the stator winding, with each positive and negative semiconductor switch S1 and S2 equipped with its series over running fly-forward diode D1 and D2 for an embodiment wherein the motor top speed must exceed the supply voltage available. The electronics of the output stages shown in FIG. 12 are duplicated three times to power a Wye (four wire) configuration stator winding, or are duplicated six times to power a Star (seven wire) configuration Stator. The two stage LRC filters (L1 and R1 C1 and R2 C2) on each side of the diodes D1 and D2 are also shown.

Figure 13:
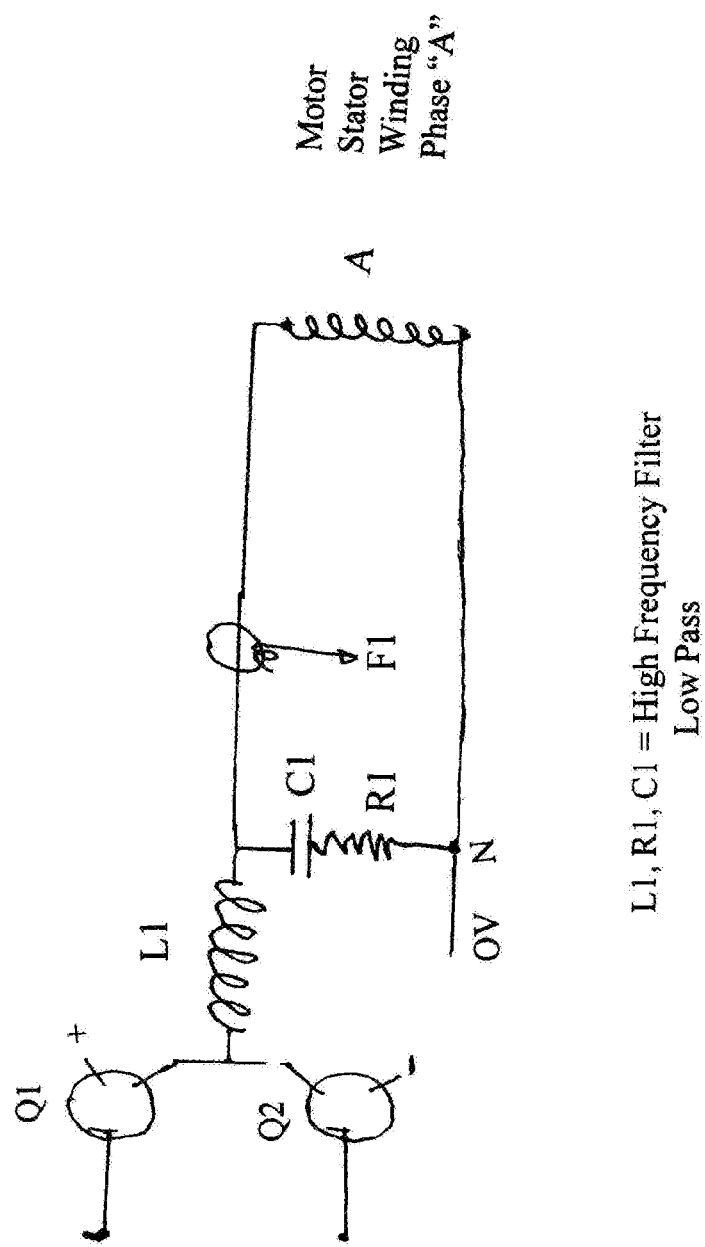
FIG. 13 is an embodiment including LRC filters in an output circuit that filter out the high frequency semiconductor switching frequency without the over-running fly-forward diodes.

FIG. 13 shows an alternative embodiment of LRC filters that filter out the high frequency semiconductor switching frequency in an output circuit without the over-running fly-forward diodes.

Figure 14:
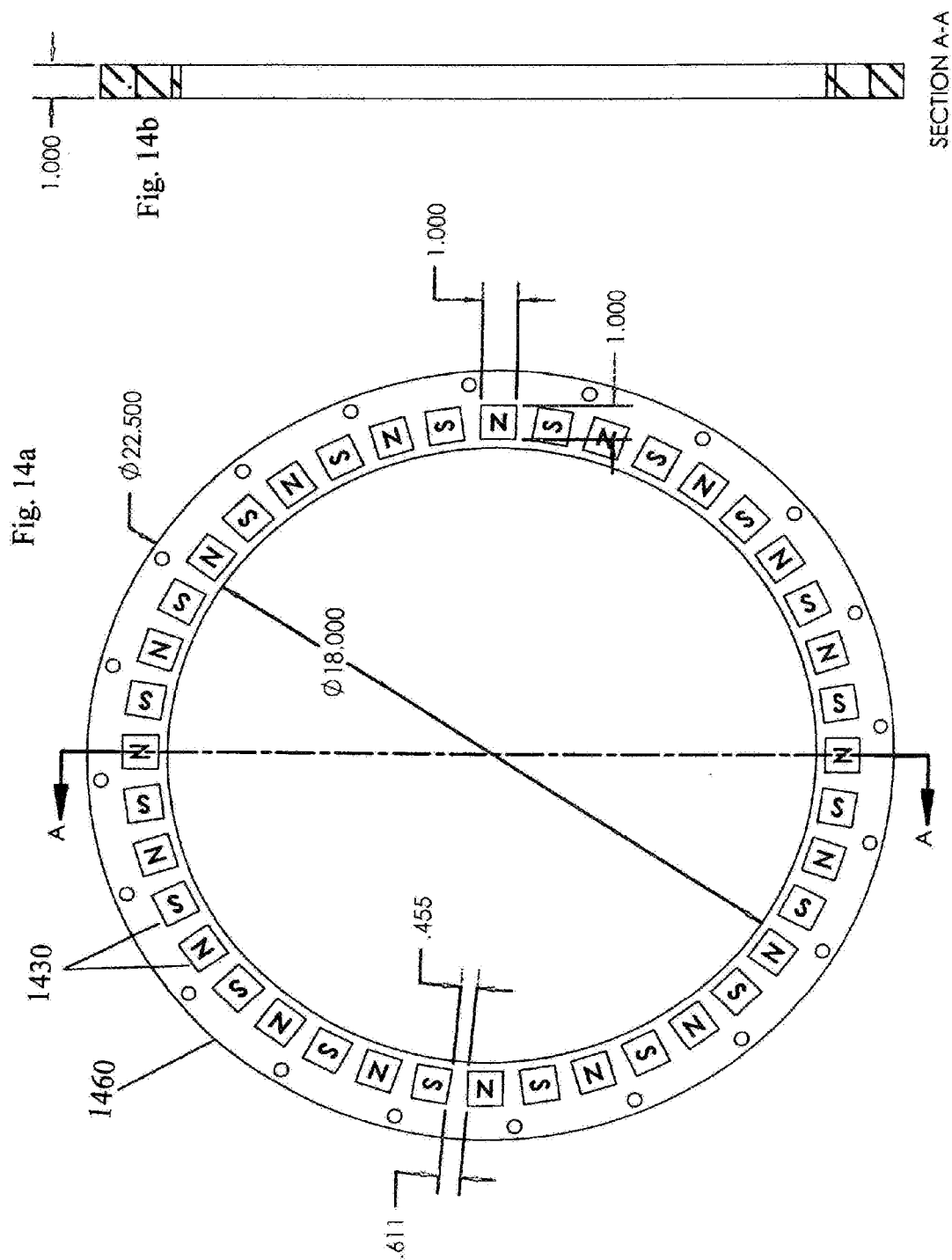

FIG. 14a is a side view showing a single rotor assembly according to the single rotor 1460 embodiment showing the spacing of the magnets 1430. FIG. 14b is a side view of the single rotor assembly shown in FIG. 14a to illustrate an approximately width of the rotor. In this embodiment, the radial spacing of the magnet poles is at least approximately 25% of the magnet face width to reduce magnetic flux fringing losses. In an embodiment, the spacing of the permanent magnets is increased to at least 1.25 times the width of the magnet face to reduce fringing losses and the swept width of the molded magnetic flux channel pole piece is increased to approximately 1.25 times the magnet width in order to improve the motor torque and EMF waveform.

Figure 15:
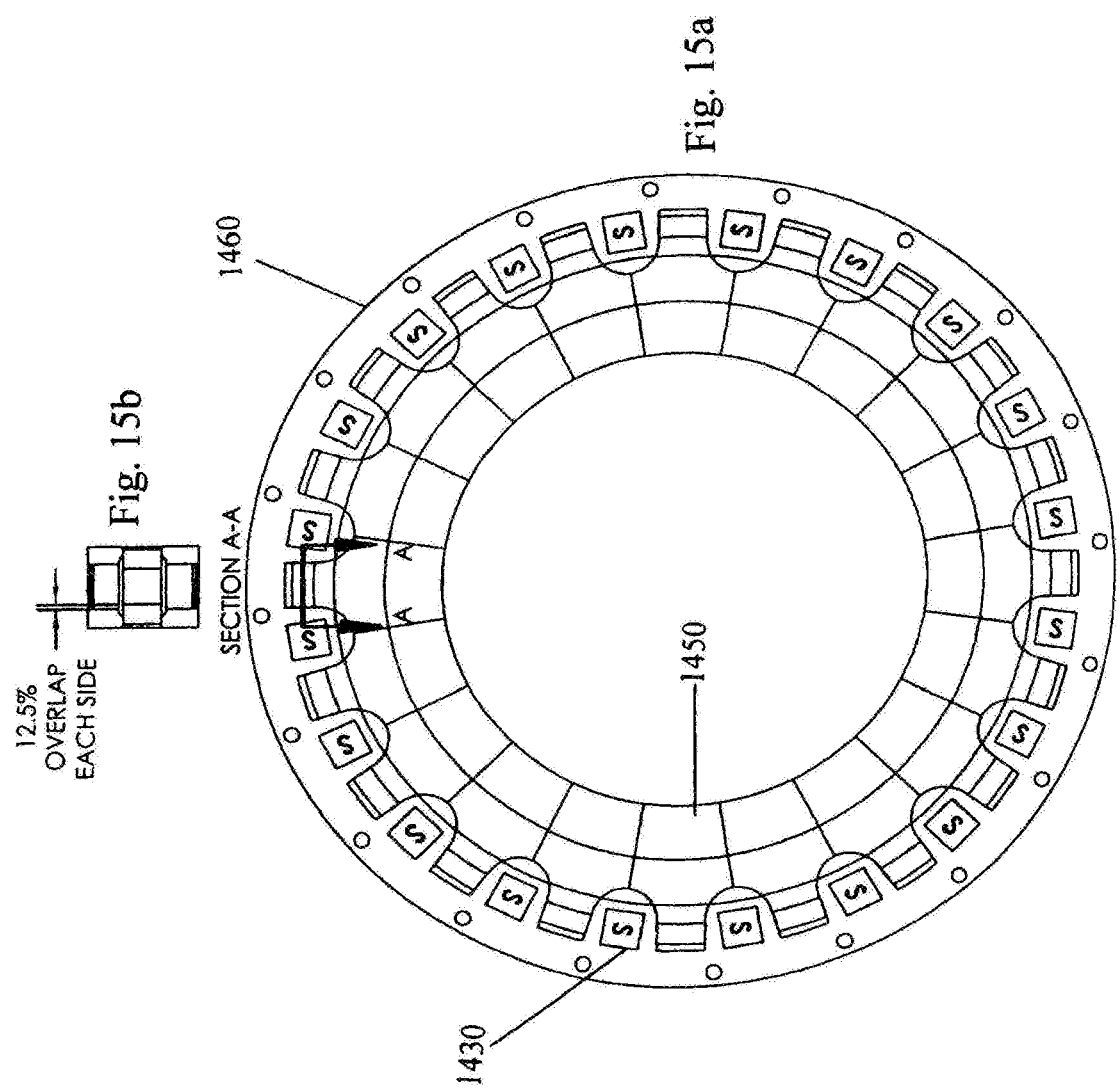
FIG. 15a is an end view of a rotor disc surrounded with mated molded magnetic flux channel pole pieces, and in particular showing the overhang dimension of the MMFC pole face being greater than the magnet pole dimension on all sides with the axial dimension totaling at least approximately 25% greater than the radial magnet pole dimensions.
FIG. 15b is a sectional view of the radial magnetic pole dimensions.
Figure 16:
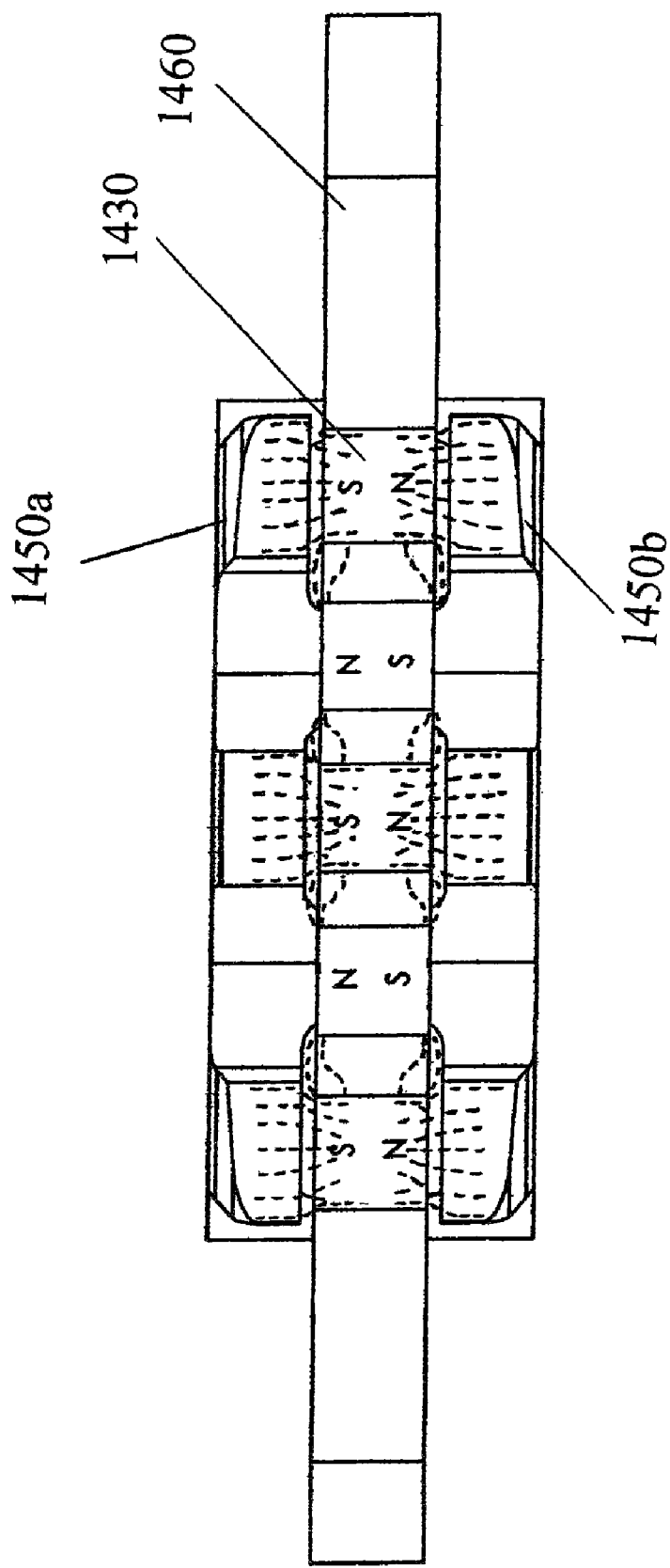
FIG. 16 shows the magnetic lines of force resulting from this architecture, with minimum fringing losses.

FIG. 15a is an end view of a rotor disc 1460 shown in FIG. 14a interfacing with mated molded magnetic flux channel pole pieces 1450, and in particular showing the overhang dimension (shown as section A-A) of the mated magnetic flux channel pole face being greater than the magnet pole dimension on all sides with the axial dimension totaling at least approximately 25% greater than the radial magnet pole dimensions shown in the sectional view in FIG. 15b. FIG. 16 is an edge view of four magnetic pole pieces 1450 to show the magnetic lines of force within the mated pole pieces resulting from this architecture, with minimum fringing losses.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A parallel pole direct drive wheel motor comprising: an outside rotor having a rotor disc having plural holes around a circumference of the rotor disc a distance from an outer edge thereof with plural magnets having alternating polarities flush mounted into the plural holes;
   an inside stator assembly having a ring of plural molded magnetic flux channel pole pieces corresponding to a phase of the motor forming a hollow channel for housing a transversely wound stator windings to capture and focus magnetic flux emanating from the transverse winding and the hollow channel to the plural pole pieces, each pole piece body of the respective plural pole pieces having a u-shaped gap above the hollow channel to receive the rotor disc, and said rotor plural magnets, with a gap therebetween; and, said each pole piece body formed with tapered exterior sides and radiused curves in a base of the u-shaped gap to direct and focus the captured magnetic flux toward and delivering the captured magnetic flux to axial magnetic pole flat surfaces with parallel sides of the u-shaped gap, perpendicular magnetic lines of force emanating at the pole piece surfaces; and
   a controller coupled with a feedback electronics for monitoring a timing, speed and direction and coupling the feedback signal to a processing unit for determining and adjusting and drive electronics to driving the phase windings.

2. The motor of claim 1 wherein the rotor disc containing the plural magnets is one of a plastic or other inert material and having plural alignment and mounting holes for connection of the torque produced by said interaction to the rotor of the parallel pole direct drive wheel motor.

3. The motor of claim 1 wherein each one of the plural molded magnetic flux channel pole pieces comprises: two pole pieces mated to form the hollow channel connected at the base of the channel and have an isolation gap above the hollow channel and the u-shaped gap above the isolation gap.

4. The motor of claim 1 wherein the gap between an upper portion of mated first and second pole pieces above the transversely wound stator winding comprises:
   an isolation gap between the hollow channel and the u-shaped gap to minimize fringing loss during operation; and
   an axial said u-shaped gap is an axial u-shaped gap above the isolation gap, the axial u-shaped gap larger than the isolation gap for mating the plural magnets with the axial u-shaped gap to deflect the magnetic flux from the stator winding and channel to the magnets.

5. The motor of claim 4 wherein the axial u-shaped gap comprises:
   a c-shaped lower section formed by the mated first and second pole piece, each one of the first and second pole piece having a first flux focus angle forming a first deflection area and a second flux focus angle forming a second deflection area to deflect the flux; and
   parallel pole piece interior surfaces forming an upper section of the axial u-shaped gap, the plural magnets passing between the parallel surfaces during operation with a gap between each parallel pole pieces and each pole of the plural magnets.

6. The motor of claim 1, wherein each plural molded magnetic flux channel pole pieces is pressed from a high magnetic permeability powder material.

7. The motor of claim 1 wherein each plural molded magnetic flux channel pole pieces is fabricated from insulated iron wires wound on a forming mandrel and then potted in an epoxy base.

8. The motor of claim 7 wherein each plural molded magnetic flux channel pole pieces is fabricated with from the insulated iron wires wound on a mandrel, then impregnated and then potted in an epoxy base.

9. The motor of claim 1 wherein the rotor disc is a non-metallic rotor disc rotor disc with the plural holes cut out by a numerically controlled water jet abrasive cutter to flush mounted Neodynium-irom-boron permanent magnets in the plural plural holes.

10. The motor of claim 1 wherein the rotor disc is a composite material selected from a group consisting of fiberglass or carbon fiber matrix with the plural holes that are water jet machined in the rotor disc, alternating pole Neodymium-boron-iron permanent magnets alternatingly inserted into the plural holes.

11. The motor of claim 9 wherein the rotor disc is a plastic rotor disc in which the permanent magnets are flush mounted and are bonded in place with epoxy or with cyanoacrylate anaerobic adhesives.

12. The motor of claim 1 wherein the magnets are plural flush mounted neodymium-iron-boron permanent magnets with alternating poles, the radial spacing between adjacent permanent magnets is at least approximately 25 percent of the pole face radial dimension.

13. The motor of claim 1 wherein the spacing between adjacent magnets is greater than or equal to approximately 1.25 a width of the magnet face to reduce fringing losses and the swept width of the molded magnetic flux channel pole piece is increased to 1.25 times the magnet width in order to improve the motor torque and EMF waveform.

14. The motor of claim 1 wherein the rotor disc comprises:
plural rotor discs separated by rotor disc spacers to form the outside rotor.

15. The motor of claim 1 wherein the rotor disc is fabricated into two or more segments to allow said rotor disc segments to be inserted into the pole piece u-shaped gap after the stator assembly is complete.

16. The motor of claim 1 wherein the drive electronics comprises:
a WYE, Delta, or STAR configured electrical circuit connected to the transverse stator windings to apply voltage waveform and current to the transverse stator winding.

17. The motor of claim 16 wherein the feedback electronics comprises:
a sensor device to sense speed, acceleration, and load connected with the processing unit to send a signal representing the sensed speed, acceleration, and load wherein the processing unit to adjust the timing and waveform of the applied voltage and current to the windings according to an optimum waveform and timing information digitally stored in a lookup table database.

18. The motor of claim 16, further comprising:
plural silicon carbide MOSFET semiconductor switches, each one connected to one leg of the one of the STAR, DELTA, OR WYE electrical circuits to independently drive each transverse winding and reduce electrical interaction to increase switching frequency and efficiency.

19. The motor of claim 18, further comprising:
a voltage regulator; and
a power semiconductor switch serially connected to feed a stator phase winding, the semiconductor switches switched on and off once for each electrical half cycle to apply the voltage waveform to the corresponding stator phase winding from the output of the series voltage regulator.

20. The motor of claim 18, further comprising:
a voltage regulator; and
a power semiconductor switch serially connected to feed a stator phase winding, the semiconductor switches switched on and off once for each electrical half cycle to vary a pulse timing and duration to control motor speed and torque.

21. The motor of claim 18, further comprising:
an LRC filter connected between the semiconductor switches and the one of the STAR, DELTA, OR WYE electrical circuits to remove switching frequency noise to reduce interference to the magnetization response of the molded magnetic flux channels pole pieces to reducing hysteresis loss and improve torque and efficiency.

22. The motor of claim 21 further comprising:
a feedback circuit for obtaining a current feedback waveform from the output of the LRC filters, wherein the processing unit compares the current feedback signal with a stored optimal current waveform to generate a corrected applied voltage and current waveform to driving the transverse windings of the motor during operation.

23. The motor of claim 1, wherein the controller feedback circuit comprises:
plural cascaded Hall effect sensors located near the path of the rotor permanent magnets to generate a stair step sine wave to conveys information on rotor speed, direction, and timing to the processing for generating an output waveform for driving the motor.

24. The motor of claim 1 wherein the controller further comprises:
a waveform lookup table stored memory coupled with the processing unit, the waveform lookup table containing digital representations of optimal current and voltage waveforms for best motor performance at various speeds, power loadings, acceleration and deceleration rates, wherein the processing unit compares the feedback signal with data in the waveform lookup table to adjust the output of the drive electronics.

25. The motor of claim 18 further comprising:
an over-running fly-forward diode in series with each semiconductor switch to allow higher speed motor operation wherein the reverse EMF voltage of the stator can exceed the maximum power supply voltage available.

26. The motor of claim 1, wherein the motor is a direct drive wheel motor with a tubeless tire fitted directly to the rim of the wheel motor.

27. The motor of claim 1, wherein the motor is a direct drive marine propeller motor with the motor fitted directly in the hub of a marine propeller.

28. The motor of claim 1, wherein the motor is a generator in a direct drive wind turbine wherein the generator is fitted directly into the hub of a wind turbine assembly.

29. The motor of claim 1, wherein the motor is a direct drive dynamo wherein the dynamo is directly driven by a shaft from any low speed power source.

30. The motor of claim 1, wherein plural molded magnetic flux channel pole pieces of the inside stator comprises:
at least two sets of molded magnetic flux channel pole pieces forming a corresponding channel, each set separated by a distance and corresponding to one phase of the motor; and
at least two transverse windings, a section of each one of the transverse windings passing through one of the channels, the remaining section of each transverse winding folding back outside the set of molded magnetic flux channel pole pieces in close proximity to the outer base of the set of corresponding molded magnetic flux channel pole pieces, each set of molded magnetic flux channel pole pieces and corresponding transverse winding forming a partial stator.

31. The motor of claim 1, further comprising:
a non-metallic alignment plate having alignment slots; and
an alignment key protruding from the outer side of each one of the plural molded magnetic flux channel pole pieces to align the plural molded magnetic flux channel pole pieces with the alignment slots in the non-metallic alignment disc.

32. The motor in claim 31, wherein the non-metallic disc is used to locate, time, and mount the stator molded magnetic flux channel pole pieces and transmit the torque reaction to the non-rotating axle.

33. The motor of claim 30, further comprising:
an alignment key protruding from an exterior side of each of the molded magnetic flux channel pole pieces; and an alignment disc having alignment slots corresponding to the alignment key to key the molded magnetic flux channel pole pieces in place, the alignment disc on the same axis having an offset for the stator segments of 120 electrical degrees.

34. The motor in claim 33, wherein the stator segments are offset by 90 electrical degrees from each other axially on the same plane.

* * * * *